(12) United States Patent
Ido et al.

(10) Patent No.: US 7,801,182 B2
(45) Date of Patent: Sep. 21, 2010

(54) TRANSMISSION DATA STRUCTURE, AND METHOD AND DEVICE FOR TRANSMITTING THE SAME

(75) Inventors: Daiji Ido, Yokohama (JP); Yoshinori Matsui, Ikoma (JP); Masataka Sugiura, Setagaya (JP)

(73) Assignee: Panasonic Corporation, Osaka (JP)

( * ) Notice: Subject to any disclaimer, the term of this patent is extended or adjusted under 35 U.S.C. 154(b) by 1516 days.

(21) Appl. No.: 10/527,040

(22) PCT Filed: Nov. 13, 2003

(86) PCT No.: PCT/JP03/14417

§ 371 (c)(1), (2), (4) Date: Mar. 9, 2005

(87) PCT Pub. No.: WO2004/045214

PCT Pub. Date: May 27, 2004

(65) Prior Publication Data
US 2006/0023720 A1    Feb. 2, 2006

(30) Foreign Application Priority Data
Nov. 14, 2002    (JP)    ............................. 2002-331410
Jan. 24, 2003    (JP)    ............................. 2003-016364

(51) Int. Cl.
*H04J 3/00*    (2006.01)
(52) U.S. Cl. ........................ 370/498; 370/464; 370/465; 370/265; 370/503; 370/522

(58) Field of Classification Search .................. 370/216, 370/229, 231, 235, 236, 265, 310, 345, 347, 370/394, 410, 464, 465, 468, 474, 486, 498, 370/503, 516, 517, 522; 709/217, 224, 225, 709/231, 232
See application file for complete search history.

(56) References Cited

U.S. PATENT DOCUMENTS 5,564,073 A * 10/1996 Takahisa ..................... 455/3.06
5,793,980 A *  8/1998 Glaser et al. ................. 709/231
5,812,937 A *  9/1998 Takahisa et al. ............. 455/66.1

(Continued)

OTHER PUBLICATIONS

PCT International Search Report dated Feb. 24, 2004.

(Continued)

*Primary Examiner*—Pankaj Kumar
*Assistant Examiner*—Mark A Mais
(74) *Attorney, Agent, or Firm*—Dickinson Wright PLLC

(57) ABSTRACT

Information relating to a playback of divided static media data included in static media transmission data is stored in static media transmission data previous than the static media transmission data, and transmitted, thereby making it possible to determine whether there is no divided static media data originally or lost when the divided static media data is not received. Accordingly, in the case where static media such as timed text and the like is used in distribution of streaming type, when receiving no static media data, a data receiving apparatus determines whether there is no media data to be next displayed or media data is lost in the course of transmission to notify a user of loss of media data correctly. Moreover, it is possible to reduce time required for packet loss detection to execute a retransmission request without increasing pre-buffering.

21 Claims, 18 Drawing Sheets

U.S. PATENT DOCUMENTS

| | | | | |
|---|---|---|---|---|
| 5,838,678 A * | 11/1998 | Davis et al. | .................. | 370/389 |
| 5,913,009 A * | 6/1999 | Kuboji et al. | .................. | 386/68 |
| 5,930,233 A | 7/1999 | Kanerva et al. | | |
| 6,009,176 A * | 12/1999 | Gennaro et al. | ............. | 713/170 |
| 6,496,896 B1 * | 12/2002 | Inoue | ........................ | 710/306 |
| 6,988,238 B1 * | 1/2006 | Kovacevic et al. | .......... | 714/799 |
| 6,993,073 B2 * | 1/2006 | Foong et al. | ........... | 375/240.03 |
| 7,020,284 B2 * | 3/2006 | Boykin et al. | ............... | 380/200 |
| 7,061,942 B2 * | 6/2006 | Noronha et al. | ............. | 370/537 |
| 7,068,922 B2 * | 6/2006 | Murata | ....................... | 386/125 |
| 7,106,381 B2 * | 9/2006 | Molaro et al. | ............... | 348/468 |
| 7,116,894 B1 * | 10/2006 | Chatterton | ................... | 386/95 |
| 7,164,680 B2 * | 1/2007 | Loguinov | ................... | 370/394 |
| 7,197,234 B1 * | 3/2007 | Chatterton | ................... | 386/95 |
| 7,243,131 B1 * | 7/2007 | Inoue | ........................ | 709/208 |
| 7,292,775 B1 * | 11/2007 | Boyle et al. | ................... | 386/83 |
| 7,325,244 B2 * | 1/2008 | Boyle et al. | ................... | 725/39 |
| 2002/0159454 A1 * | 10/2002 | Delmas | ..................... | 370/389 |
| 2003/0190148 A1 * | 10/2003 | Lee | ............................. | 386/70 |

OTHER PUBLICATIONS

Westerlund M. et al.; Generic RTP Payload Format for Time-Lined Static Media, [online], Jul. 12, 2001, Internet Draft, [Retrieved on Feb. 12, 2004], Retrieved form the Internet: <URL: http://standards.ericsson.net/westerlund/draft-westerlund-avt-rtp-static-media-00/txt>.

Real Text Markup, [online], Oct. 1, 2002, Internet Draft, [Retrieved on Feb. 12, 2004, Retrieved from the Internet: <URL: http://service.real.com/help/library/guides/realone/ProductionGuide/HTML/htmfiles/realtext.htm>.

Rey J. et al., RTP Payload Format for 3GPP Timed Text, [online], Sep. 18, 2003, Internet Draft, [Retrieved on Feb. 12, 2004, Retrieved from the Internet: <URL: http://www.cs.columbia.edu/-ngs/rtp/drafts/draft-rey-avt-3gpp-timed-texted-01.txt>.

3GPP TS 26.234 v5.0.0 (Mar. 2002), 3rd Generation Partnership Project; Technical Specification Group Services and System Aspects; Transparent end-to-end packet switched streaming service (PSS); Protocols and codecs (Release 5), pp. 1-80.

* cited by examiner

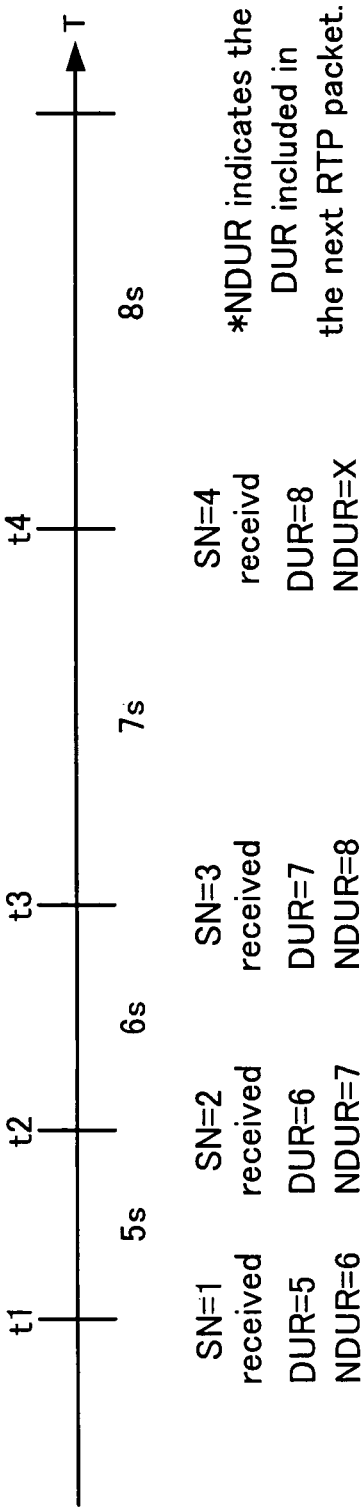

TRANSMISSION DATA STRUCTURE, AND METHOD AND DEVICE FOR TRANSMITTING THE SAME

TECHNICAL FIELD

The present invention relates to a transmission data structure that transmits static media data such as text data and a method and apparatus for transmitting static media data.

BACKGROUND ART

SA (Service and System Aspect) WG4 group of 3GPP (Third Generation Partnership Project), which is an organization that develops global standards of third generation mobile communications (W-CDMA), has developed multimedia distribution standard TS26.234. Version 5.2.0 of multimedia distribution standard TS26.234 extends a file of MP4 (ISO/IEC 14496-1:2001) format usable in download-type multimedia distribution, and defines the data structure of text data (timed text). This makes it possible to play not only video and audio but also text in service that plays the MP4 file as downloading.

Information notification using text is very important as information notification means because information to be transmitted can be directly transmitted to a user and the amount of data may be extremely small as compared with video. In the aforementioned service that plays the MP4 file as downloading, the text is transmitted as an independent track instead of the fact that the video and the text are combined to be coded and the result is transmitted, and this reduces a case in which the text cannot be read since it is defaced and makes it possible to efficiently send information notification.

Moreover, in timed text defined by 3GPP, a part of the text can be modified, moved, or a link to another URL can be adhered to a character string (style, highlight, karaoke, text box, blink, scroll, hyperlink, and the like). This allows playback of information to be transmitted in various expression formats.

Here, the data structure of timed text defined by 3GPP is explained using FIG. 1.

An MP4 file 10 includes a header section 20 and a data section 30. The header section 20 includes a track header 40, a sample description 50, and a sample table 60. The data section 30 includes text samples 70, 71 . . . .

The track header 40 is information relating to playback of the timed text, and includes information of the layout (size of display region, relative position with video), layer (hierarchical relationship with other media such as video and the like), playback time of the timed text, file playback time and date, and a time scale of Time-to-Sample-box 61 to be described later, and the like.

The sample description 50 includes multiple sample entries 51, 52 . . . .

The sample entries 51, 52 . . . are information relating to a default format of the text samples 70, 71 . . . including the presence or absence of a scroll and its direction, horizontal and vertical justification positions, background color, font name, font size, and the like.

The sample table 60 includes a Time-to-Sample-box 61, a sample-size-box 62, and a sample-to-chunk-box 63. The Time-to-Sample-Box 61 includes information 65, 66 . . . relating to playback time of text samples 70, 71 . . . in the order of arrangement of the text samples 70, 71 . . . . The time scales of values stored by information 65, 66 . . . are designated by the track header 40. More specifically, the track header 40 stores one-second resolution as a time scale. For example, when the value of the time scale stored by the track header 40 is [1000], resolution in ¹⁄₁₀₀₀ second units can be obtained. Accordingly, the values obtained by converting the playback times of the text samples 70, 71 . . . to units of seconds become values obtained by dividing information 65, 66 . . . by the values of the time scale stored by the track header 40. For example, when the value of the time scale is [1000], a value [3400] indicated by information 66 means that the text sample 71 is played for 3.4 seconds. The following explanation is given on assumption that the value of the time scale is [1000]. The sample-size-box 62 includes information 67, 68 . . . relating to data lengths of the text samples 70, 71 . . . in the order of arrangement of the text samples 70, 71 . . . . This makes it possible for the playing side to detect each boundary between information of the respective text samples 70, 71 . . . . The sample-to-chunk-box 63 includes information that associates the text samples 70, 71 . . . with the sample entries 51, 52 . . . .

The text sample 70 includes a text 75, a data length 76 of the text 75, and a modifier 77. The modifier 77 is information on an optional format of the text 75, and information for playing the text 75 by highlight, karaoke, blink, hyperlink, and the like. Since the other text samples 71 . . . have the same data structure as that of the text sample 70, the explanation is omitted.

A specific explanation is next given of playback of the timed text using FIG. 2.

First of all, a specific structure of the sample entry 51 is explained with reference to FIG. 2A. The other sample entries, 52 . . . have the same structure and the explanation is omitted. The sample entry 51 includes the presence or absence of the scroll and the direction ("Display Flags"), horizontal and vertical justification positions ("Horizontal justification," "Vertical justification") in a display region, a background color ("bgColor") designated by RGB values and transparency, a display region ("TextBox"), a font name ("fontTable," "font ID"), a font size ("fontSize"), a style ("faceStyle") such as bold, italic, underline, etc, and a font color ("textColor") designated by RGB values and transparency. Additionally, data ("startChar," "EndChar"), which designates a range to which this format is applied, always takes a value of [0], and shows that this format is applied to the whole range of text in the text sample to which the format designated by the sample entry 51 is applied. Each value of the sample entry 51 shown in FIG. 2 means that the default format of the text 75 is designated so that the background color is white, the font color is black, and the style is normal.

An explanation is next given of the specific structure of the modifier 77 with reference to FIG. 2B. The modifier 77 includes a data length ("modifierSize") of the modifier 77, a designation ("modifierType," "entryCount") of an optional format of the text 75, a designation ("startChar," "EndChar") of the range of the text 75 to which the optical format is applied, a font name ("font ID"), a font size ("fontSize"), a style ("faceStyle") such as boldface, italic, underline, etc, and a font color ("textColor") designated by RGB values and transparency. The designation of this optional format is applied with priority higher than the format designated by any one of the sample entries 51, 52 . . . . The respective values of the modifier 77 shown in FIG. 2B mean that fifth to eighth characters of the text 75 are expressed in boldface type.

FIG. 2C illustrates a playback state of the text sample 70 to which the aforementioned format is applied. For example, when the content indicated by the text 75 is [It's fine today], [fine] of the fifth to eighth characters is played in boldface type. Moreover, it is shown from the value [1000] of information 65 first arranged in the Time-to-Sample-Box 61 that the playback time is 1000 [milliseconds] (FIG. 1).

At the time of playing the MP4 file having the aforementioned structure, the MP4 file is downloaded in advance by a receiving terminal, and the MP4 file is played by the receiving terminal after completion of the download. TCP, which is a reliable transmission protocol, is normally used in downloading the MP4 file, and it is guaranteed that the MP4 file is received in a complete form by the receiving terminal.

While, in the service that distributes media data including video and audio, streaming distribution is increasingly adopted in place of the download type. In streaming distribution, the process of receiving media data by the receiving terminal and the process of playing the received media data are performed in parallel. For this reason, there is an advantage in which waiting time from when the media data is requested until a playback is performed is reduced even when long-time media data is played. Moreover, this is the distribution format suitable for distributing media data to be broadcasted live.

In such streaming distribution, RTP/UDP is used as the transmission protocol for transmitting media data in place of TCP. TCP is a reliable protocol that ensures transmission of data, while RTP/UDP is an unreliable protocol that excels in real-time performance and is suitable for streaming distribution.

As a scheme for transmitting static media such as and static image using RTP, there is Generic RTP Payload Format for Time-lined static Media. This is a scheme in which a duration header is provided to express playback time (duration) and has a feature in which playback time is sent to the receiving side. Moreover, the use of RTP instead of TCP makes it possible to employ real-time transmission of the static media.

However, in the case of the stream type distribution using RTP/UDP, a packet including media data is lost on a wired network and a radio transmission path in some cases, so that the text to be played cannot displayed. Since the receiving terminal receives no data in any of cases where the packet is lost and where media data to be played next is not transmitted, there is a problem that the receiving terminal cannot determine whether there is no media data to be next displayed or media data is lost in the course of transmission to make it impossible to execute the display. For this reason, it is impossible to notify the user of the loss of media data by executing such a display that "data cannot be received now."

While, in the case of streaming using RTP, there is a case in which packet loss occurs depending on the condition of the transmission path. In the packet transmission using RTP, a packet loss is detected from a sequence number (SN) given to RTP. Namely, when a packet whose SN is 5 is received where a packet whose SN is 4 is not received, it is determined that an RTP packet whose SN is 4 is lost. In the case of continuous media such as speech and video data, a transmission interval between the respective RTP packets is short, about several tens of milliseconds to 100 milliseconds, so that such a packet loss determination method is allowed to be executed. In the case where the packet loss has a large influence upon quality, a retransmission request is executed after determination of the packet loss, thereby making it possible to prevent quality deterioration. In this case, in order to absorb delay due to retransmission, pre-buffering time for obtaining data for 2 to 3 seconds in advance is generally provided before the playback of media starts.

However, in the case where the streaming using RTP is applied to text media such as timed text and static media including JPEG data, the following problems occur. Since the playback time of static media, that is, the time for displaying the same text and the same static image is generally a few seconds to dozen or so seconds, an RTP packet transmission interval becomes a few seconds to dozen or so seconds accordingly. The RTP packet transmission interval is equal to time required for packet loss detection, and is longer than the general pre-buffering time. Accordingly, it is difficult to absorb time required for packet loss detection by the pre-buffing time. Moreover, if the pre-buffering time is increased to, for example, about 10 to 20 seconds, there is a problem that user comfort is severely damaged.

DISCLOSURE OF INVENTION

An object of the present invention is to provide a data structure, data transmitting apparatus and data receiving apparatus that make it possible to determine whether there is no media data to display next or media data is lost in the course of transmission and cannot be displayed, and correctly report loss of media data to a user, when static media such as timed text is used in streaming distribution and a data receiving terminal receives no static media data.

This object can be achieved by storing and transmitting information relating to playback of divided static media data contained in static media transmission, in earlier static media transmission data than the static media transmission data, thereby determining, when the divided static image data is not received, whether there is no divided static media data in the first place or there has been a loss.

Moreover, another object of the present invention is to provide a data transmitting method and data receiving apparatus that reduce time required for packet loss detection to execute a retransmission request without increasing pre-buffering, when static media such as timed text is used in streaming distribution.

With reference to playback time information included in static media transmission data, when static media to be played next is not received after playback time is over, it is determined that a packet loss has occurred to judge whether a retransmission request should be executed, thereby the above object can be achieved.

BRIEF DESCRIPTION OF DRAWINGS

FIG. 17A is a schematic diagram illustrating a display operation of a data receiving apparatus;

FIG. 17B is a schematic diagram illustrating a display operation of a data receiving apparatus;

BEST MODE FOR CARRYING OUT THE INVENTION

The following specifically explains embodiments of the present invention with reference to drawings.

Embodiment 1

Embodiment 1 explains streaming transmission of a text track using RTP (Real Time Transport Protocol), RTSP (Real Time Streaming Protocol) and SDP (Session Description Protocol).

RTP is a packet format of a multimedia stream defined by RFC1889 recommended by IETF (Internet Engineering Task Force). RTSP and SDP are control protocols of multimedia streaming defined by RFC2326 and RFC2327, respectively. Additionally, in this embodiment, an explanation is given of a case in which text data is used as static media data.

Figure 3:
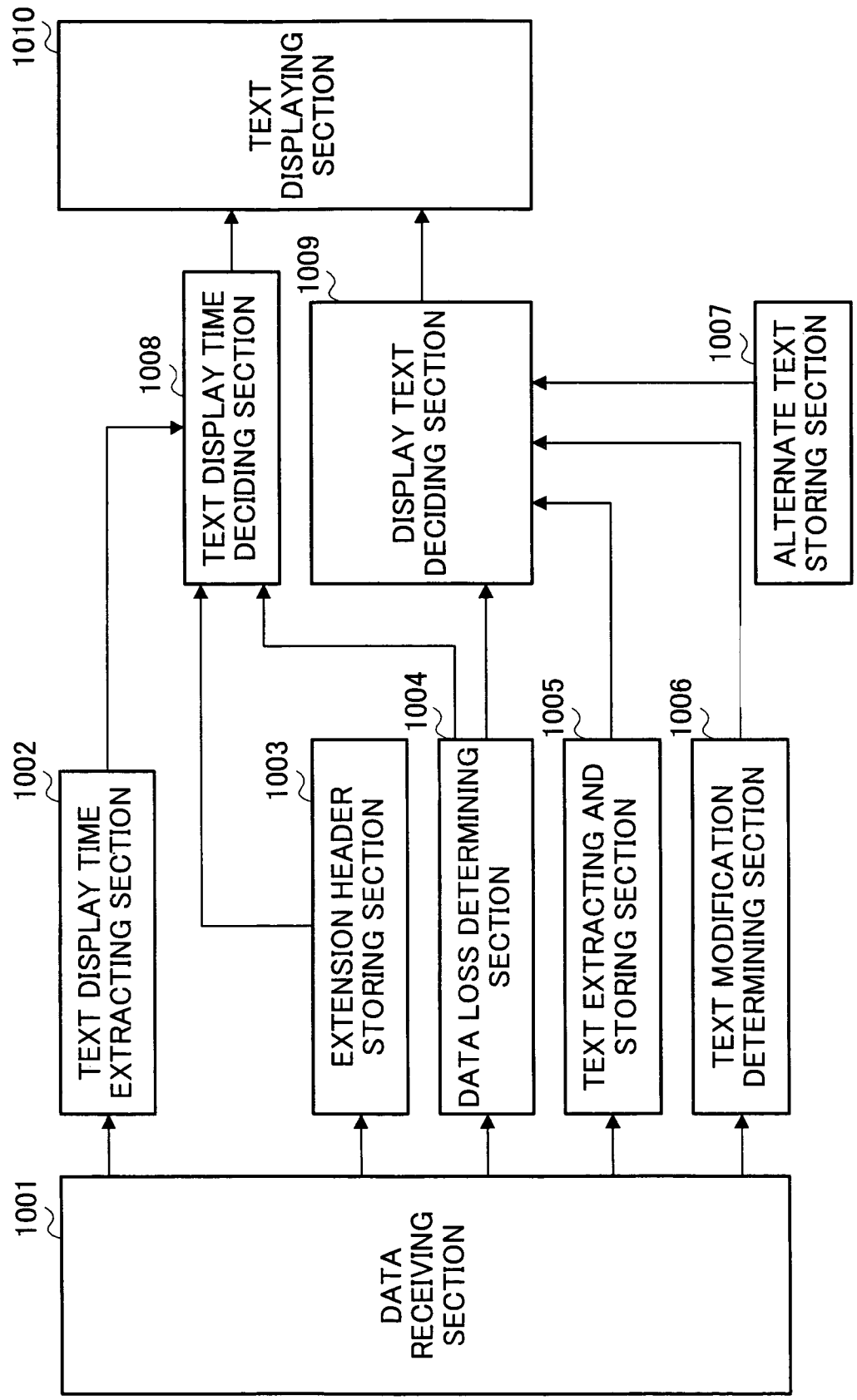
FIG. 3 is a block diagram illustrating a configuration of a data receiving apparatus of the present invention.

FIG. 3 is a block diagram illustrating a configuration of a data receiving apparatus according to Embodiment 1 of the present invention.

The data receiving apparatus includes a data receiving section 1001 that receives an RTP packet including text data, a text display time extracting section 1002 that extracts time for displaying a text included in the RTP packet, an extension header storing section 1003 that extracts a next text length included in an RTP packet extension header of the RTP packet and a next text display time storing section to store, a data loss determining section 1004 that determines that the RTP packet is lost or delayed when the RTP packet is not received even at the time when the RTP packet should be received, a text extracting and storing section 1005 that extracts text data included in the RTP packet to store, a text modification determining section 1006 that determines modification information for modifying text data such as a font, a color, and the like from the received data, an alternate text storing section 1007 that stores an alternate text to be displayed when text data to be displayed cannot be used by loss of the RTP packet or delay thereof, a text display time deciding section 1008 that decides time extracted by the text display time extracting section 1002 or time for displaying text data from the next text display time storing section stored in the extension header storing section 1003, a display text deciding section 1009 that decides a display text according to a modification method in which text data included in the RTP packet is determined by the text modification determining section when the packet is not lost or delayed, and decides that the alternate text stored by the alternate text storing section 1007 is displayed when the packet is lost or delayed, and a text displaying section 1010 that displays time decided by the text display time deciding section 1008 and the text decided by the display text deciding section 1009. Additionally, when it is determined that there is no data loss by the data loss determining section 1004, the display text deciding section 1009 decides that the text stored in the text extracting and storing section 1005 is displayed by the modifying method determined by the text modification determining section 1006.

In the data receiving apparatus, when the data loss determining section 1004 determines that there is no data loss, the text display time extracting section 1002 extracts time (Duration 8006 to be described in FIG. 4) for displaying the text included in the RTP packet and the text display time deciding section 1008 selects the extracted time. Furthermore, at this time, the display text deciding section 1009 selects text data (text 8008 to be described in FIG. 4) extracted by the text extracting and storing section 1005 based on information that is supplied from the data loss determining section 1004 and indicates that there is no data loss. Accordingly, when the data loss determining section 1004 determines that there is no data loss, only the time determined by Duration 8006 where text data currently being received is included in the current RTP packet is displayed on the text displaying section 1010.

In contrast to this, when the data loss determining section 1004 determines that there is data loss, the display text deciding section 1009 selects an alternate text, for example, "*" stored in the alternate text storing section 1007 in place of the text extracting and storing section 1005 based on the result. Moreover, at this time, based on display time (Next Sample Durations 8202, 8204, 8206 and Next Sample Lengths 8203, 8205, 8207, namely, information on display time of a portion where loss of data being currently received is caused) of extension header (Header Extension 8003 to be described in FIG. 4) received in earlier RTP packet stored in the extension header storing section 1003, the text display time deciding section 1008 causes the text displaying section 1010 to display the alternate text stored in the alternate text storing section 1007 for only the time designated by the next sample duration. Additionally, when the next sample length stored in the extension header storing section 1003 is 0, this means that there is no text to be displayed in the first place, so that the text display time deciding section 1008 causes the text displaying section 1010 to display nothing even during the time designated by Next Sample Duration.

Information that indicates display time of text data of the RTP packet being currently received and the presence or absence of text data, is stored in the extension header of earlier RTP packet and transmitted to store the extension header to the extension header storing section 1003, and this makes it possible to judge whether there is text data originally based on the stored extension header when data is lost, and this makes it possible to display the alternate text by the corresponding to the time when data loss is determined even though there is text data originally.

Here, media data of an MP4 file format provided by a server relating to Embodiment 1 of the present invention is transmitted as an RTP packet.

Figure 4:
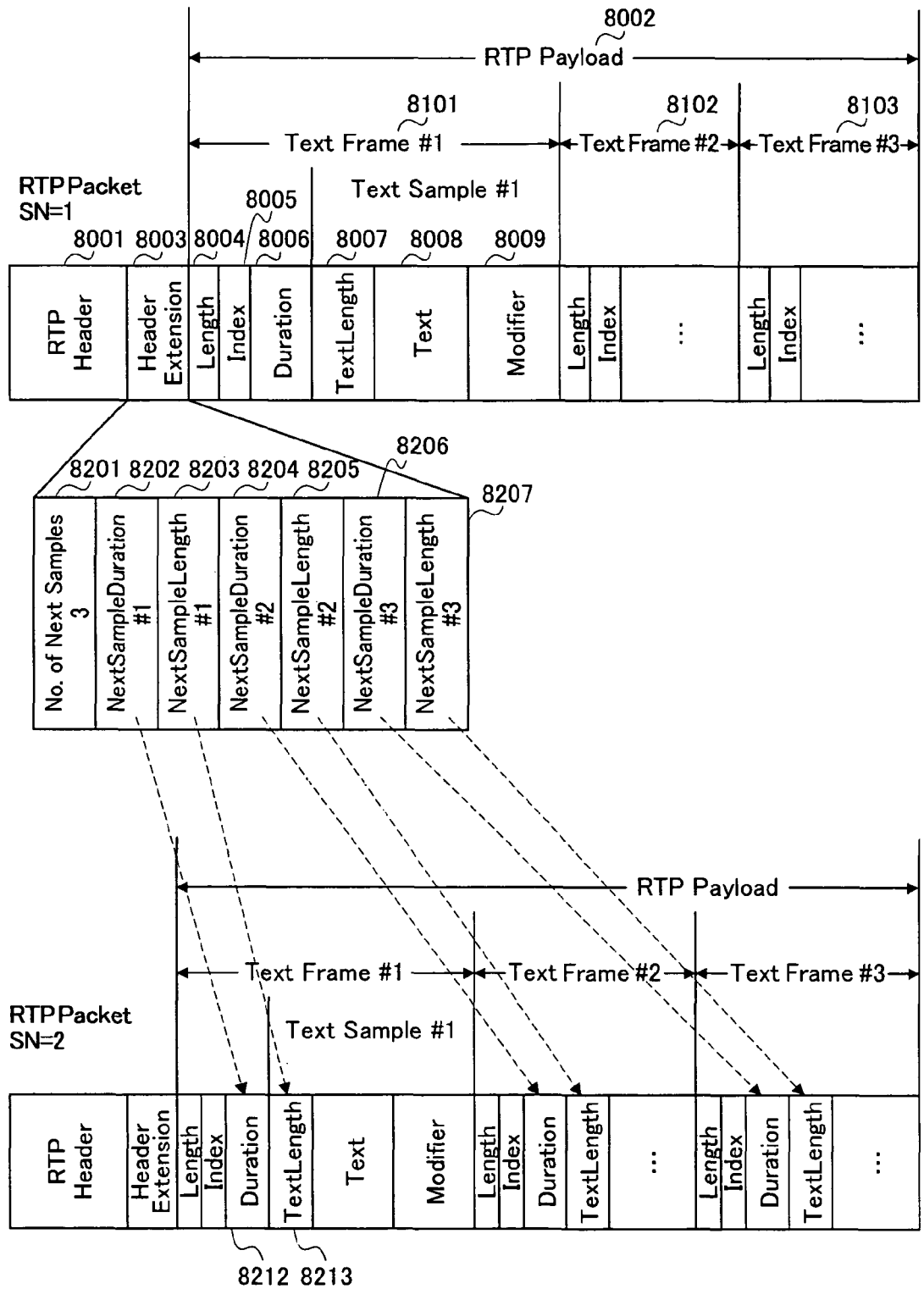
FIG. 4 is a schematic diagram illustrating a data structure of an RTP packet of the present invention.

In order to use timed text provided by the MP4 file by the streaming transmission, the RTP packet has a data structure shown in FIG. 4. The data structure of the RTP packet shown in FIG. 4 includes an RTP header 8001 and an RTP payload 8002. In this embodiment, the entire packet including the RTP header 8001 and the RTP payload 8002 is called text transmission data. The RTP payload includes a Header Extension (extension header) 8003 to be described later and text frames #1, #2, #3 (8101, 8102, 8103) each having one text sample. The configuration of each text frame is explained using the text frame #1 (8101). Since the text frames #2 and #3 and the following have the same configuration, the explanation is omitted. Additionally, in this embodiment, the RTP header 8001 and the Header Extension (extension header) of the RTP payload are called a header section.

Figure 1:
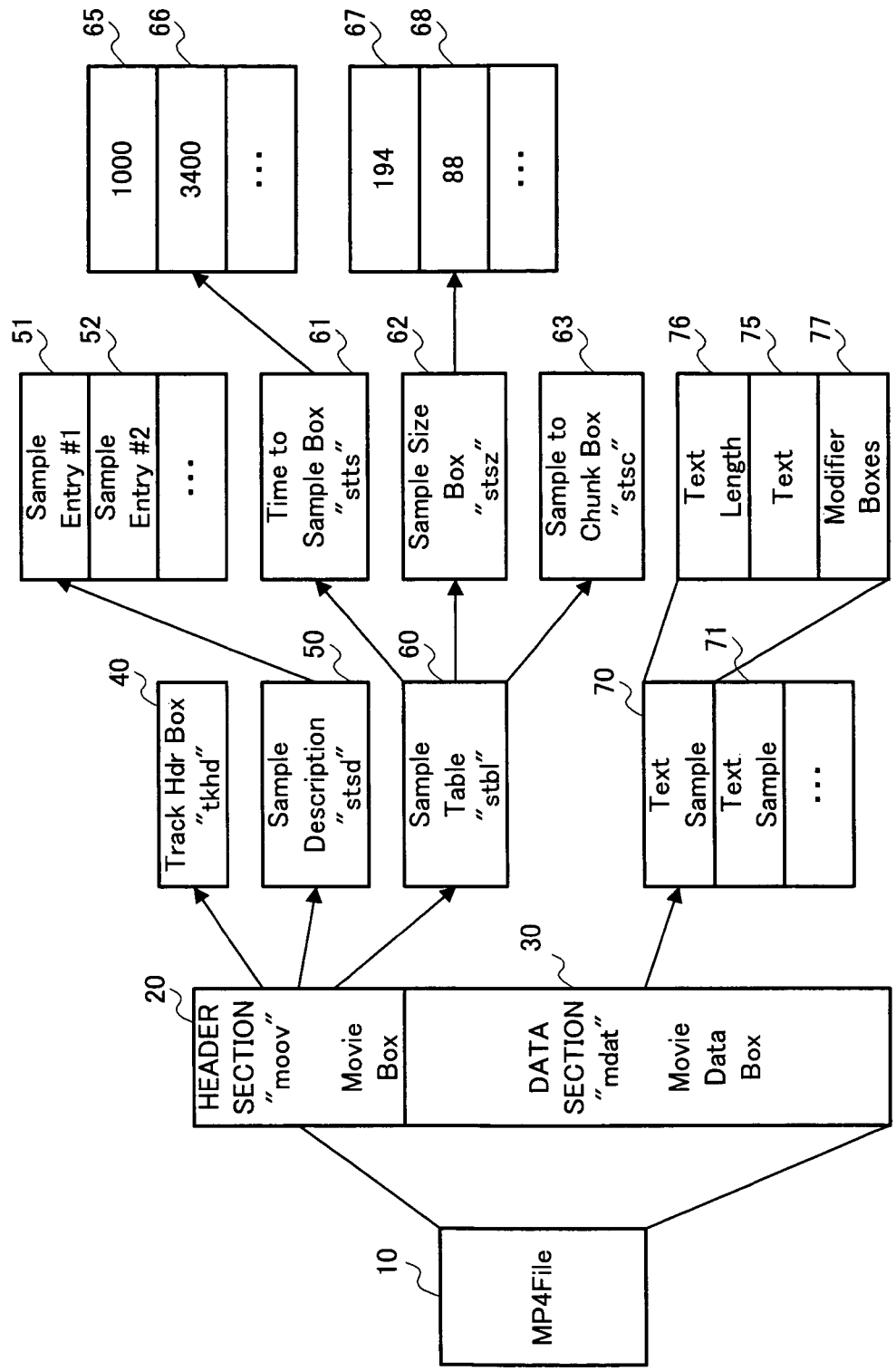
FIG. 1 is a schematic diagram illustrating a data structure of timed text defined by 3GPP.
Figure 2C:
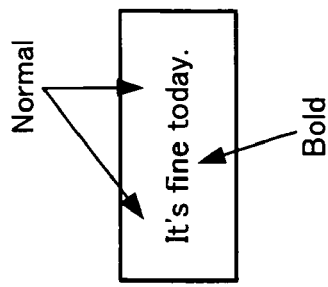
FIG. 2C is a schematic diagram illustrating a data structure of timed text.
Figure 2A:
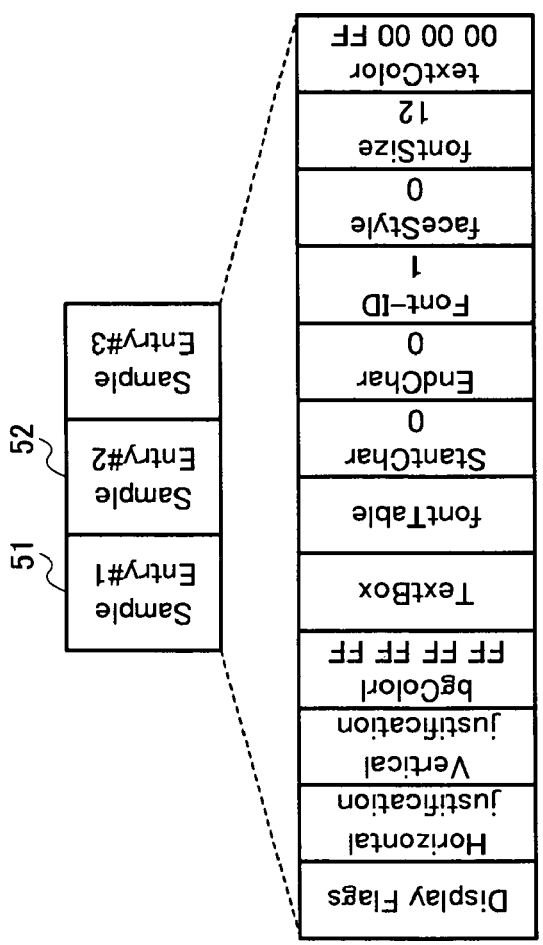
FIG. 2A is a schematic diagram illustrating a data structure of timed text.
Figure 2B:
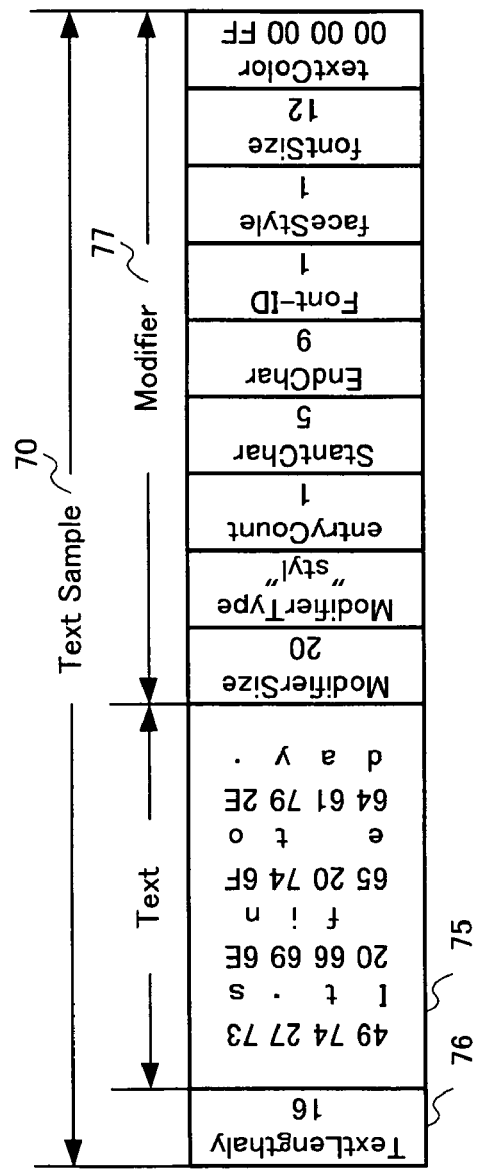
FIG. 2B is a schematic diagram illustrating a data structure of timed text.

The configuration of the text frame 8101 includes a Length 8004 indicating a text frame length, an Index 8005 indicating the relation with a sample entry, a Duration 8006 indicating time for displaying the text sample, a Text Length 8007 indicating the length of the text included in the text sample, a displaying text 8008, and an information Modifier 8009 for modifying the text. In this embodiment, the Length 8004 indicating the text frame length, the Index 8005 indicating the relation with the sample entry, the Duration 8006 indicating time for displaying the text sample are together called text header data, and a text sample, which includes the Text Length 8007 indicating the length of the text included in the text sample, the Text 8008 to be displayed and the information Modifier 8009 for modifying the text, is called divided text data. Moreover, text playback data means the MP4 file 3000 mentioned in FIG. 1. Data that forms a header section 3010 of the MP4 file 3000 shown in FIG. 1 is stored in the text frame of the RTP packet together with the corresponding text sample (divided text data) as text header data (Length 8004 indicating the text frame length, Index 8005 indicating the relation with the sample entry, and Duration 8006 indicating time for displaying the text sample) shown in FIG. 4.

An explanation is next given of the configuration of the Header Extension (extension header) 8003 that describes information of the text frame included in a next RTP packet (SN=2). The Header Extension (extension header) 8003 includes No. of Next Samples 8201 indicating the number of text frames included in a next RTP packet, Next Sample Duration #1 8202 indicating information of the text frame included in a next RTP, Next Sample Length #1 8203, Next Sample Duration #2 8204, Next Sample Length #2 8205 .... When No. of Next Samples 8003 is 3, this indicates that three text frames are included in the next RTP packet. An explanation is given of Next Sample Duration #1 8202 and Next Sample Length #1 8203, which are information of the first text frame included in the next RTP packet. The second text frame and the following are the same as that of the first text frame and the explanation is omitted. Next Sample Duration #1 8202 indicates text display time of the first text frame included in the next RTP packet. Next Sample Length #1 8203 indicates a text length to the first text frame included in the next RTP packet. In other words, Next Sample Duration #1 8202 is the same as Duration 8212 of the RTP packet with SN=2, and Next Sample Length #1 8203 is the same as Text Length 8213 of the RTP packet with SN=2.

Figure 5:
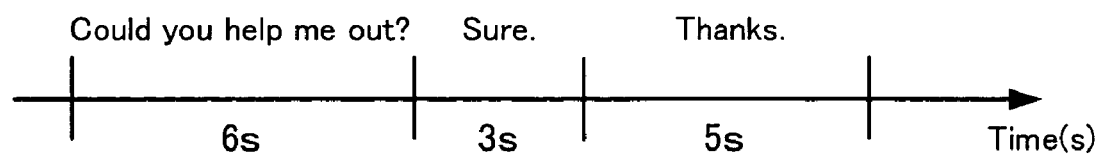
FIG. 5 is a schematic diagram illustrating a text display example of a data display method of the present invention.

An explanation is given of an example of an operation of a receiving terminal when the above transmission structure is used. An explanation is given of an example in which display as illustrated in FIG. 5 is given to the receiving terminal apparatus. First of all, "Could you help me out?" whose text length is 22 is displayed for 6 seconds and "Sure" whose text length is 5 is displayed for 3 seconds, and "Thanks" whose text length is 7 is displayed for 5 seconds. In addition, space is also counted in the number of characters.

An explanation is given of a method for storing timed text to the RTP packet in this case using FIG. 4. Additionally, in this case, an explanation is given of a case in which one text sample is stored in 1RTP. In the RTP packet with SN=1, "Could you help me out?" is stored in a text field and 6000 is stored in Duration, and 22 is stored in Text Length. 3000 and 5 are stored in Next Sample Duration, which indicates text frame display time included a next RTP packet (SN=2) and Next Sample Length, respectively, and "Sure." having 5 characters is displayed for 3 seconds. Afterward, text information is stored in RTP packets with SN2 and SN3, similarly.

Figure 6:
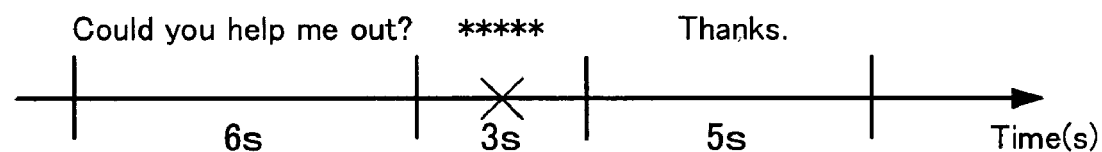
FIG. 6 is a schematic diagram illustrating a text display example when a transmission error of a data display method of the present invention occurs.

An explanation is next given of display of the receiving terminal apparatus using FIG. 6 when the RTP packet (SN=2) is lost. When receiving the RTP packet (SN=1), the receiving terminal apparatus displays "Could you help me out?" for 6 seconds, which is a designated time.

When the RTP packet (SN=2) is lost, since the next text information is not received even after 6 seconds passes, it is referenced by the Header Extension included in the RTP packet (SN=1) that the text length is 5 and that the text display time is 3 seconds, and then "*****", which corresponds to five characters, is displayed for 3 seconds where each "*" indicates that the text is not correctly received.

Figure 7:
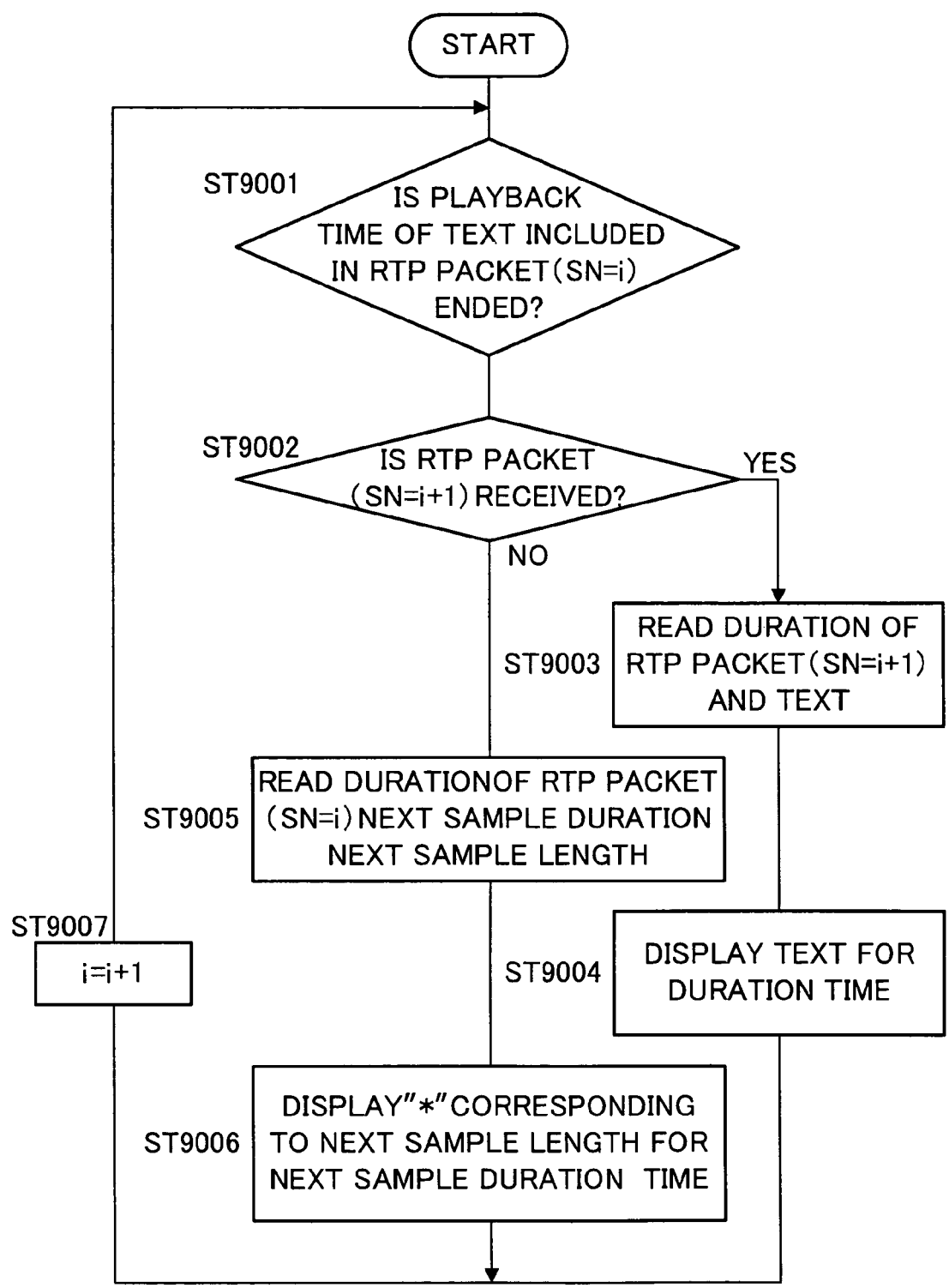
FIG. 7 is a flowchart explaining an operation of a data display method of the present invention.

An explanation is next given of an operation of the receiving terminal that has received the above-stored RTP packet using a flowchart illustrated in FIG. 7.

After receiving an RTP packet (SN=i), the receiving terminal apparatus plays a text and continues display until the playback time of the text included in SN=i is ended (step ST9001). When the playback time is ended, it is determined whether a next RTP packet with sequence No. SN=i+1 is received (step ST9002). When the RTP packet (SN=i+1) is received, the processing goes to step ST9003, and when it is not received, the processing goes to step ST9005. In step ST9003, Duration and Text are read from the received RTP packet with SN=i+1 (step ST9003) and Text is displayed to the receiving terminal for a period of time designated by Duration (step ST9004). In step ST9005, Next Sample Duration and Next Sample Length are read from the RTP packet with SN=i, and "*" indicating that data to be displayed is lost is played by the number corresponding to Text length for Next Sample Duration (step ST9006) In step ST9007, i is increased by 1.

An explanation is next given of an operation when multiple text frames are stored in 1RTP packet. An explanation is given of only a part different from a case in which one text frame is stored per one RTP.

Figure 8:
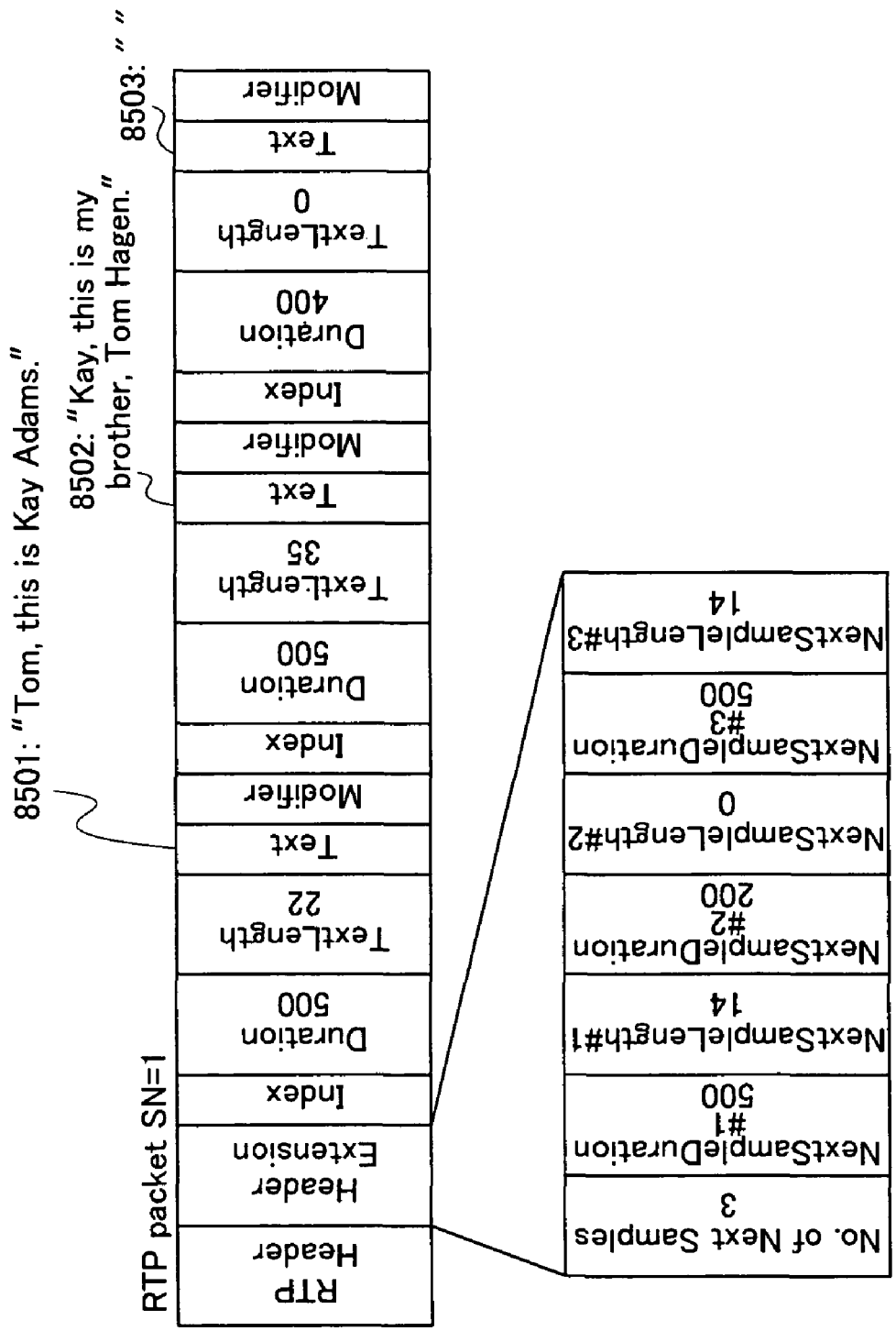
FIG. 8 is a schematic diagram illustrating a text data storage example of a data transmitting method of the present invention.
Figure 9:
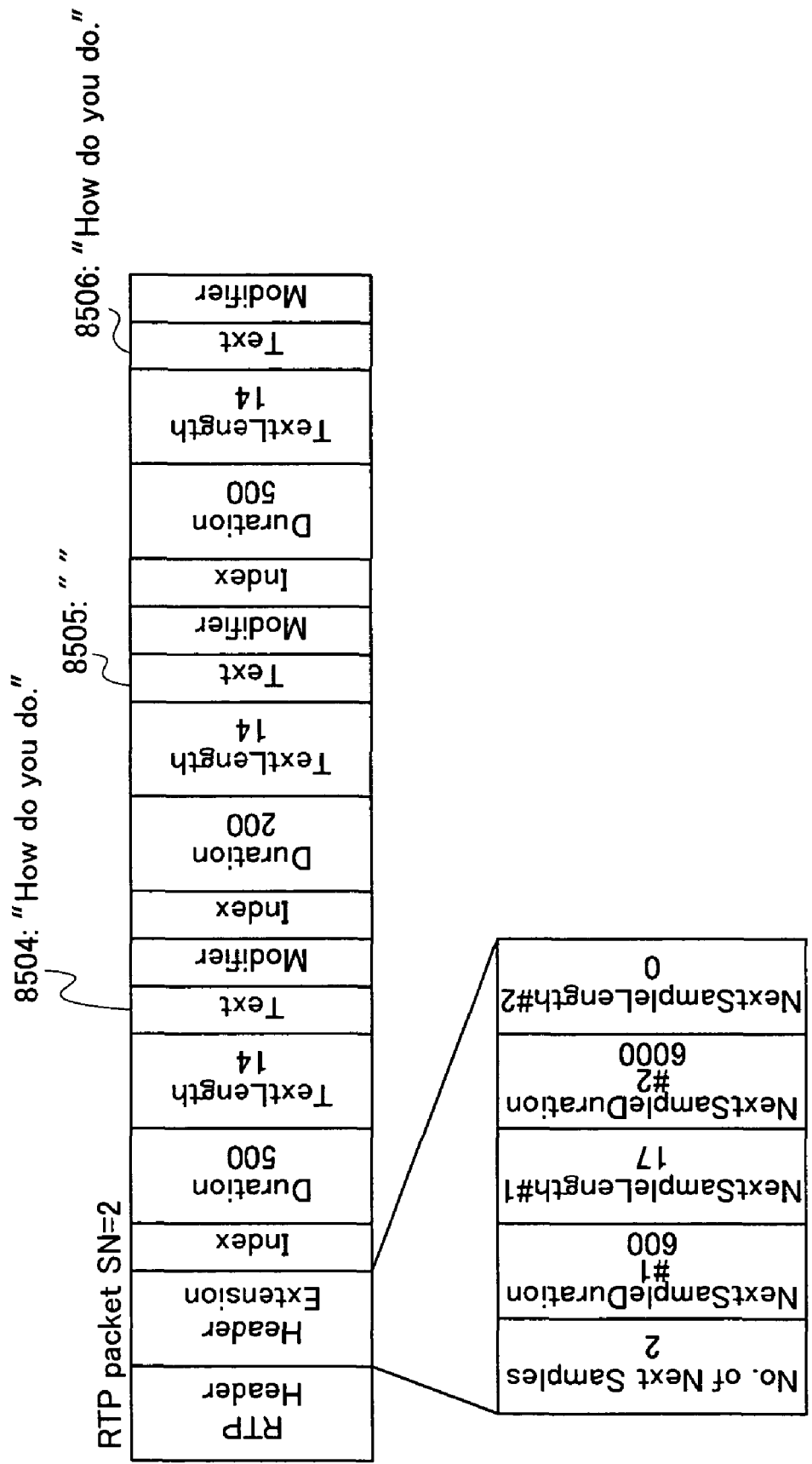
FIG. 9 is a schematic diagram illustrating a text data storage example of a data transmitting method of the present invention.
Figure 10:
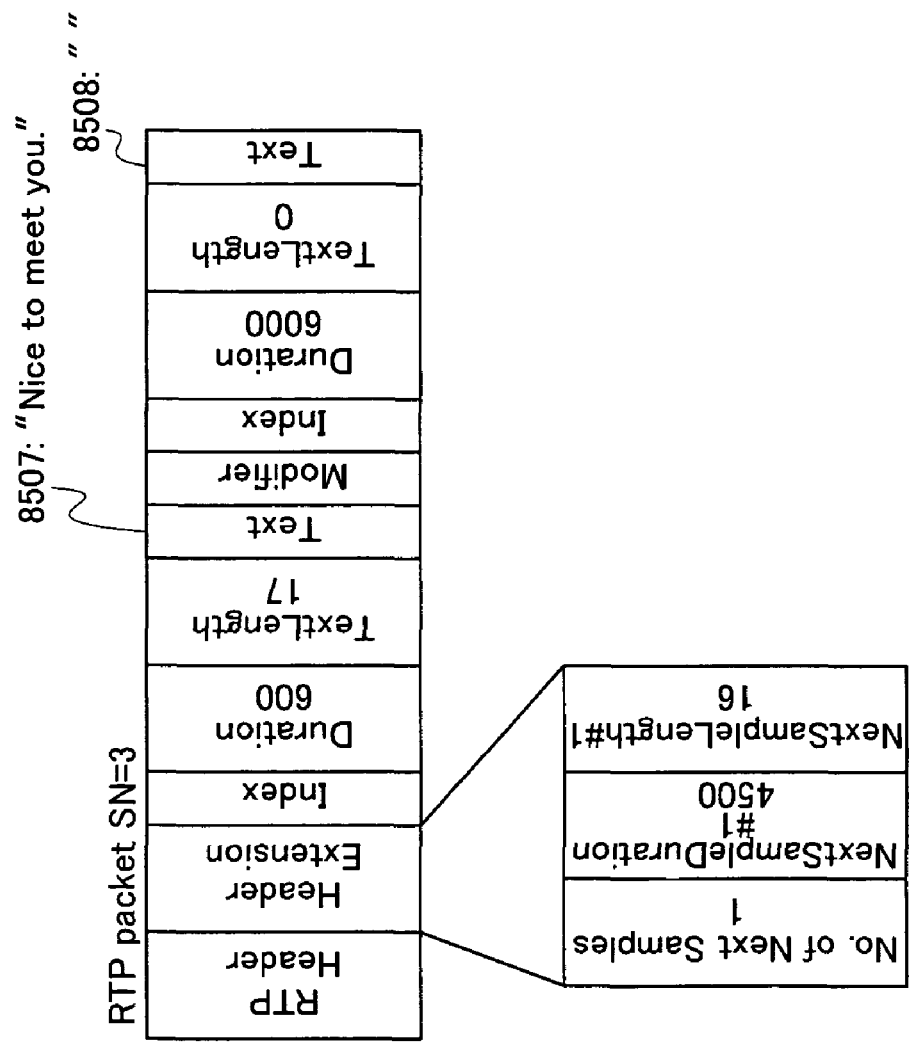
FIG. 10 is a schematic diagram illustrating a text data storage example of a data transmitting method of the present invention.

FIGS. 8, 9, and 10 illustrate examples in which the text is stored in the RTP packet. A mark " " indicates an empty text, namely, this means that no text is displayed.

A text, which includes "Tom, this is Kay Adams." 8501 and " " 8503 and "Kay, this is my brother, Tom Hagen." 8502, is stored in an RTP packet (SN=1). Text information included in an RTP packet (SN=2) is also stored in the extension header. A text, which includes "How do you do." 8504 and " " 8505, and "How do you do." 8506, is stored in the RTP packet (SN=2). Text information included in an RTP packet (SN=3) is also stored in the extension header. "Nice to meet you." 8507 and " " 8508 are stored in the RTP packet (SN=3), and text information included in an RTP packet (SN=4) is also stored in the extension header.

Figure 11:
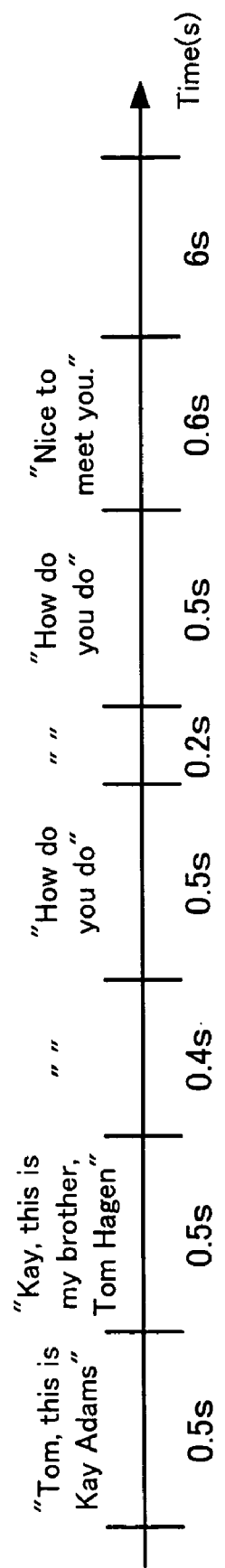
FIG. 11 is a schematic diagram illustrating a text display example when multiple texts of a data display method of the present invention are stored.

An explanation is given of a display example when there is no transmission error using FIG. 11. "Tom, this is Kay Adams." is displayed for first 0.5 seconds, "Kay, this is my brother, Tom Hagen." is displayed for next 0.5 seconds, and nothing is displayed for next 0.4 seconds. After that, "How do you do.", the empty text, "How do you do.", and "Nice to meet you.", and the empty text are displayed for 0.5 seconds, 0.2 seconds, 0.5 seconds, 0.6 seconds, and 6 seconds, respectively.

Figure 12:
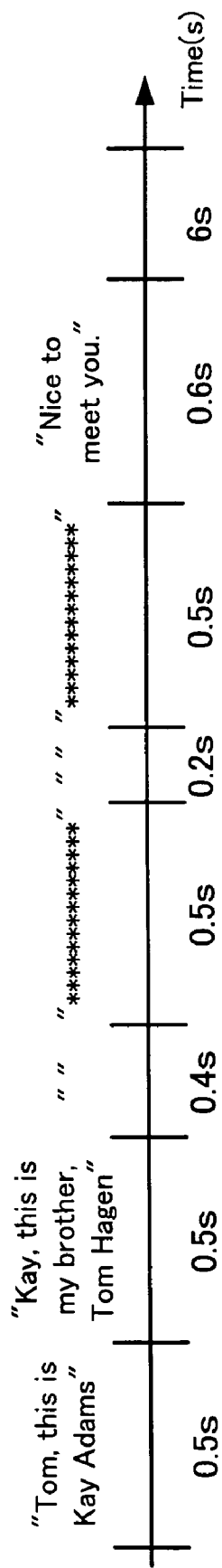
FIG. 12 is a schematic diagram illustrating a text display example when a transmission error of a data display method of the present invention occurs.

Next, the following explains a display method when the RTP packet (SN=2) is lost using FIG. 12.

Since the RTP packet with SN=1 is correctly received, "Tom, this is Kay Adams." is displayed for first 0.5 seconds, "Kay, this is my brother, Tom Hagen." is displayed for next 0.5 seconds, and nothing is displayed for next 0.4 seconds. Since the next RTP packet is lost, the next text cannot be correctly displayed. However, 14 characters for 0.5 seconds, an empty text for 0.2 seconds, and 14 characters for 0.5 seconds are stored in the extension header included in the RTP packet with SN=1, so that one in which the number of marks "*" corresponding to 14 characters is arranged is displayed for 0.5 seconds, the text is non-displayed for next 0.2 seconds, and one in which the number of marks "*" corresponding to 14 characters is arranged is displayed for next 0.5 seconds.

Additionally, though the above has explained the case of the complete loss, display may be performed using the present method when the RTP packet with SN=2 is delayed. In this case, while display is performed using the present display method, the method may be changed to a display method applied to a case in which no error occurs as soon as the delay RTP packet arrives.

Figure 13:
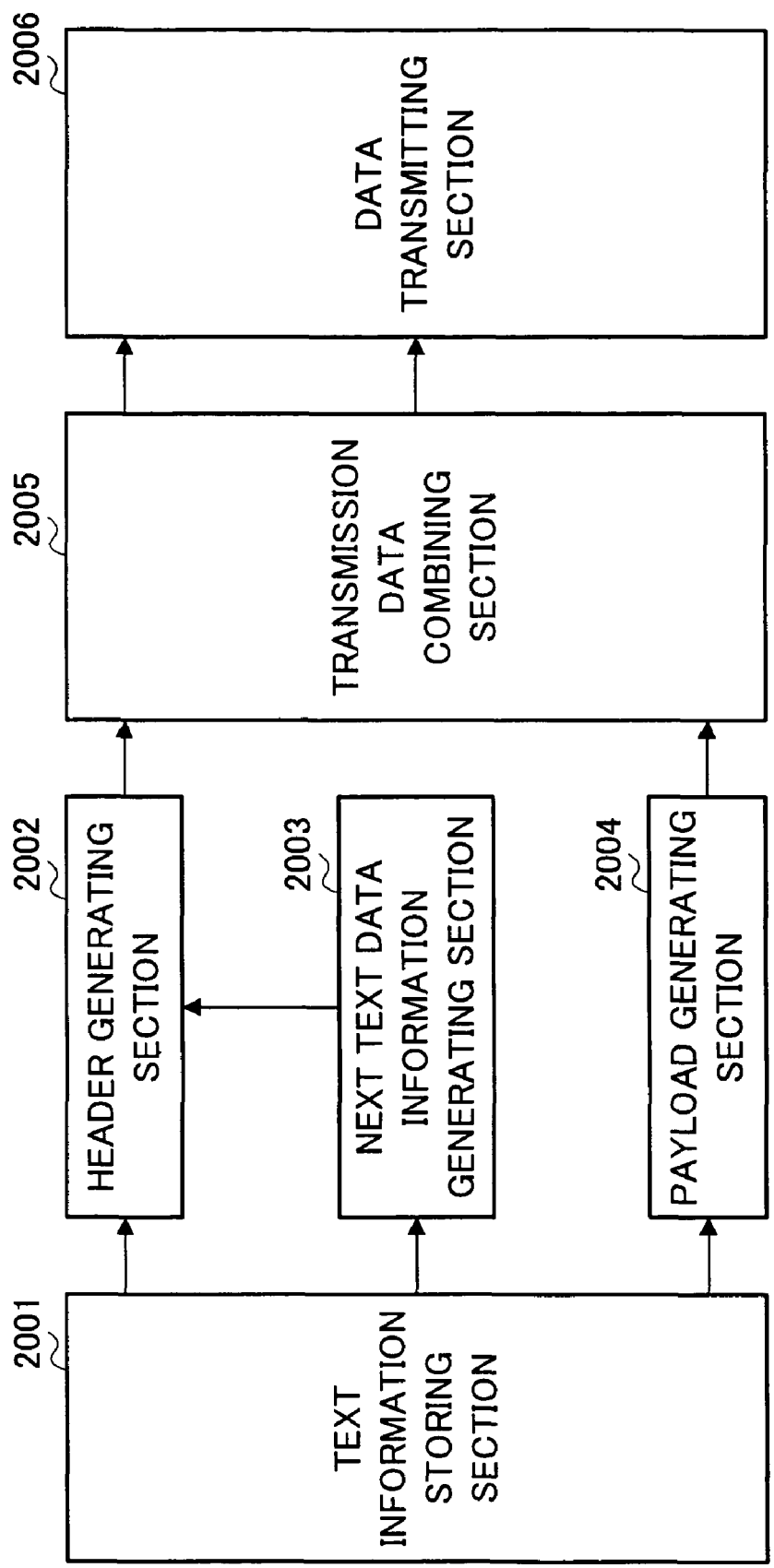
FIG. 13 is a block diagram illustrating a configuration of a data transmitting apparatus of the present invention.

FIG. 13 is a block diagram illustrating a configuration of a data transmitting apparatus according to Embodiment 1 of the present invention.

The data transmitting apparatus includes a text information storing section 2001 that stores text information to be transmitted to a transmission destination and modification information, a next text data information generating section 2003 that generates information such as a text length, playback time and the like included in a text to be transmitted as next transmission data after transmission data currently being generated, a header generating section 2002 that generates a header from control information for text data transmission and the next text data information generating information, a payload generating section 2004 that generates a payload of transmission data from text data to be transmitted and modification information, a transmission data combining section 2005 that combines transmission data from the header and the payload, and a data transmitting section 2006 that transmits transmission data to a transmission destination.

In the above-configured transmitting apparatus, the next text data information generating section 2003 reads information of the text to be transmitted as next transmission data from the text information storing section 2001, thereby making it possible to include information (text tone, playback time, etc.) contained in the text of next transmission data into transmission data being currently transmitted.

In this way, according to the data structure, data receiving terminal apparatus and data transmitting terminal apparatus, display time (Next Sample Duration) of text data to be transmitted as a next RTP packet by the extension header and the presence or absence (Next Sample Length) of text data are transmitted in advance, so that when data loss occurs, the data receiving terminal apparatus can determines whether there is no text data originally, and when there is no text data originally, an alternate text is not displayed by the text displaying section 1010, and in contrast to this, when there is text data originally, the alternate text can be displayed by the text displaying section 1010.

This allows distinction between a case in which there is data loss even though there is some text data originally and a case in which there is no data loss originally, depending on whether the alternate text such as "*" is displayed by the text displaying section 1010.

Additionally, regarding the extension header of the present invention, the presence or absence of the use of the extension header may be sent by a parameter of SDP transmitted to a client in advance before data transmission. For example, when a server transmits next transmission data information using the extension header, "next-packet-info: 1" is described in SDP, and when no extension is included, "next-packet-info: 0" can be described in SDP.

Moreover, though a case has been described with Embodiment 1 where text data is transmitted as static media data, the present invention is not limited to this and is applicable to cases of transmitting data including media data of static image data and CG, and program data by JAVA (R) language. In this case, static image data, static media data, or program data may be used in place of text data, and alternate static image data, alternate static media data, or alternate program data is stored in the alternate text storing section 1007. Regarding the alternate static image data, alternate static media data or alternate program data, the display text deciding section 1009 (that functions to decide a static image when the static image is received and that functions to decide a program when program data is received) requests an alternate static image, alternate static media or alternate program, which has a size adjusted to the size of the received static image data, static media data or program data, from the alternate storing section 1007, and the alternate text storing section 1007 supplies the request-sized alternate static image, alternate static media or alternate program to the display text deciding section 1009.

Embodiment 2

Embodiment 2 explains streaming transmission of a text track using MPEG-2 TS. The text track is data including information for executing text playback in the same expression as that of timed text defined by 3GPP.

Figure 14:
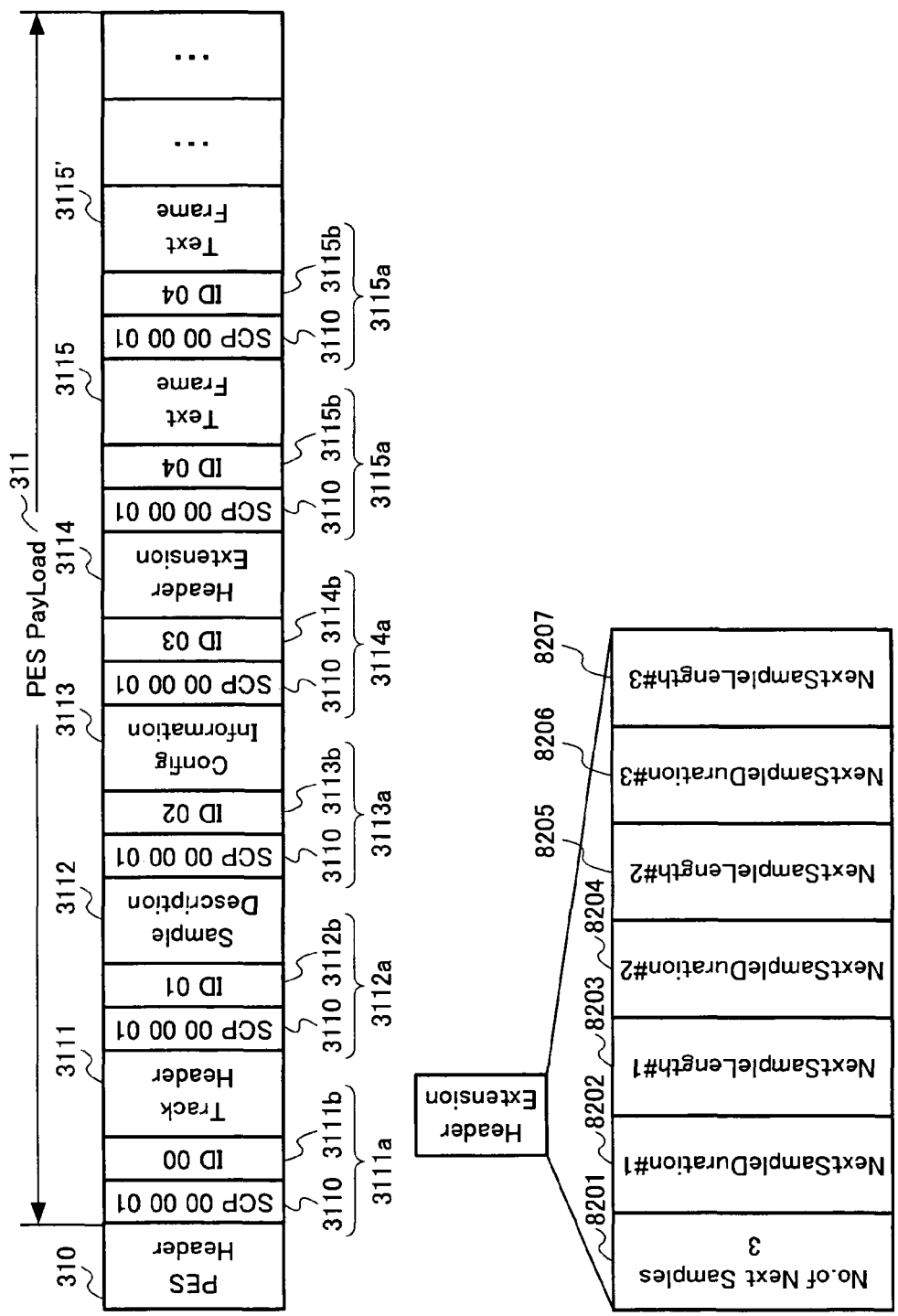
FIG. 14 is a schematic diagram illustrating a data structure of a PES packet according to Embodiment 2 of the present invention.

FIG. 14 illustrates a data structure of PES packet 1 for executing streaming transmission of the text track using MPEG-2 TS.

In the MPEG-2 system, a signal, which serves as an element forming a track such as video, audio or text, is called an ES (Elementary Stream). Moreover, one in which ES is divided into blocks each having a variable length and header information is added thereto is called a PES (Packetized Elementary Stream). In the MPEG-2 system, a TS (Transport Stream) is defined as a signal that multiplex transmits multiple PES's.

A data structure of a PES packet shown in FIG. 14 includes a PES header section 310 defined by the MPEG-2 system and a payload section 311. The PES header section 310 has a PTS (Presentation Time Stamp), which is time information for synchronous playback between tracks such as video, audio or text. The payload section 311 includes a track header 3111, a sample description 3112, config information 3113, an extension header 3114, text frames 3115, 3115', . . . and identifiers (track header identifier 3111a, a sample description identifier 3112a, a config information identifier 3113a, an extension header identifier 3114a, and a text frame identifier 3115a) for identifying each information. The track header 3111, sample description 3112, config information 3113, text frames 3115, 1335' are the same as those Embodiment 1, and the explanation is omitted. "000001" as a start code (SCP) 3110 is inserted just before the identifier of each information included in the payload.

Regarding the extension header 3114, similar to Embodiment 1, the configuration of the Header Extension (extension header) 8003 that describes information of the text frame included in the PES packet is explained. The Header Extension (extension header) 8003 includes No. of Next Samples 8201 indicating the number of text frames included in a next PES packet, Next Sample Duration #1 8202 indicating information of the text frame included in a next RTP, Next Sample Length #1 8203, Next Sample Duration #2 8204, Next Sample Length #2 8205 . . . . When No. of Next Samples 8003 is 3, this indicates that three text frames are included in the next PES packet. An explanation is given of Next Sample Duration #1 8202 and Next Sample Length #1 8203, which are information of the first text frame included in the next PES packet. The second text frame and the following are the same as that of the first text frame and the explanation is omitted. Next Sample Duration #1 8202 indicates text display time of the first text frame included in the next PES packet. Next Sample Length #1 8203 indicates a text length to the first text frame included in the next RTP packet. In other words, Next Sample Duration #1 8202 is the same as Duration 8212 of the next PES packet and Next Sample Length #1 8203 is the same as Text Length 8213 of the PES packet.

In this way, according to the data structure of this embodiment, it is possible to easily judge whether there is text data originally at the time of losing text data even in streaming transmission of the text track using MPEG-2 TS.

Embodiment 3

Embodiment 3 explains streaming transmission of a text track using an RTP (Real Rime Transport Protocol), an RTSP (Real Time Streaming Protocol), and an SDP (Session Description Protocol), similar to the case of Embodiment 1. The RTP is a packet format of a multimedia stream defined by RFC1889 recommended by IETF (Internet Engineering Task Force). RTSP and SDP are control protocols of multimedia streaming defined by RFC2326 and RFC2327, respectively. Additionally, in this embodiment, an explanation is given of a case in which text data is used as static media data.

Figure 15:
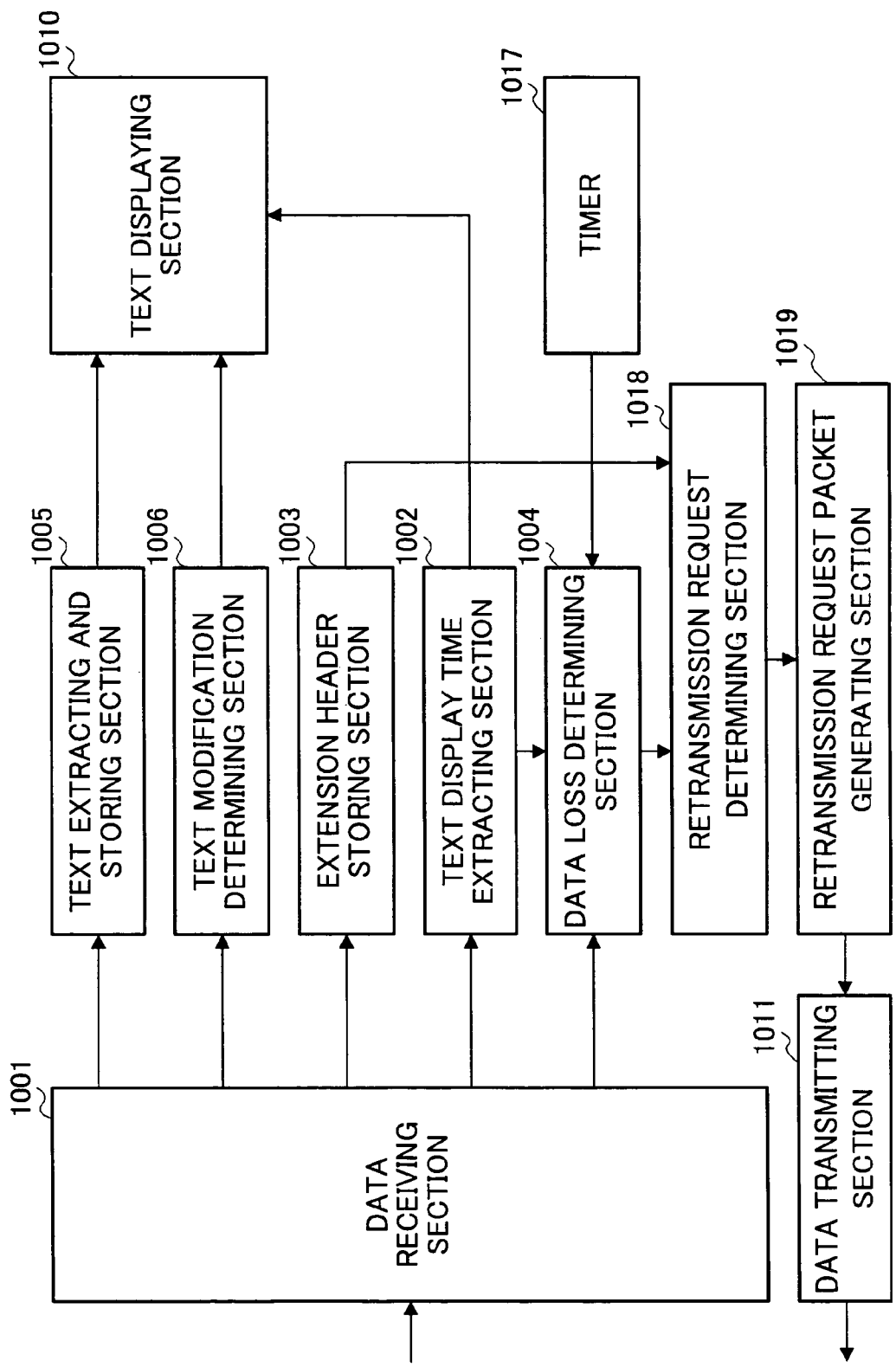
FIG. 15 is a block diagram illustrating a configuration of a data receiving apparatus according to Embodiment 3 of the present invention.

FIG. 15 is a block diagram illustrating a configuration of a data receiving apparatus according to Embodiment 3 of the present invention. The data receiving apparatus includes a data receiving section 1001 that receives an RTP packet including text data, a text display time extracting section 1002 that extracts time for displaying a text included in the RTP packet, an extension header storing section 1003 that extracts the number of characters of a next text included in the extension header section of the RTP packet and a next text display time to store, an extension header storing a timer 1017 generates time information, a data loss determining section 1004 that determines that there is loss of the RTP packet when the RTP is not received even at the time when the RTP packet should be received using the timer 1017, a text extracting and storing section 1005 that extracts text data included in the RTP packet to store, a text modification determining section 1006 that determines modification information for modifying text data such as a font, a color, and the like from received data, a text displaying section 1010 that causes a predetermined displaying section such as a liquid crystal displaying section and the like to display data, which is obtained by modifying text data output from the text extracting and storing section 1005 using modification information output from the text modification determining section 1006, by display time supplied from the text display time extracting section 1002, a retransmission request determining section 1018 that determines whether a retransmission request should be executed by calculating transmission start time of the retransmission request and transmission end time thereof using the timer 1017 when the data loss determining section 1004 determines that there is loss of the RTP packet, a retransmission request packet generating section 1019 that generates a retransmission request packet when it is determined by the retransmission request determining section 1018 that the retransmission request should be executed, and a data transmitting section 1011 that transmits the retransmission request packet generated by the retransmission request packet generating section 1019 to a transmitting side.

In the data receiving apparatus, when the data loss determining section 1004 determines that there is no data loss, the text display time extracting section 1002 extracts time (Duration 8006 mentioned in FIG. 4) for displaying the text included in the RTP packet, and the text displaying section 1010 displays the text accordingly.

Here, media data of an MP4 file format provided by a server relating to Embodiment 3 of the present invention is transmitted as an RTP packet.

Since timed text provided by the MP4 file is used by the streaming transmission, the RTP packet has a data structure shown in FIG. 4 of Embodiment 1. As illustrated in FIG. 4, the data structure of the RTP packet includes an RTP header 8001 and an RTP payload 8002. In this embodiment, the entire packet including the RTP header 8001 and the RTP payload 8002 is called text transmission data. The RTP payload includes a Header Extension (extension header) 8003 to be described later and text frames #1, #2, #3 (8101, 8101, 8103) each having one text sample. The configuration of each text frame is explained using the text frame #1 (8101). Since the text frames #2 and #3 and the following have the same configuration as that of the text frame #1, the explanation is omitted. Additionally, in this embodiment, the RTP header 8001 and the Header Extension (extension header) of the RTP payload Header Extension (extension header) are called a header section.

The configuration of the text frame 8101 includes a Length 8004 indicating a text frame length, an Index 8005 indicating the relation with a sample entry, a Duration 8006 indicating time for displaying the text sample, a Text length 8007 indicating the length of the text included in the text sample, a displaying text 8008, and an information Modifier 8009 for modifying the text. In this embodiment, the Length 8004 indicating the text frame length, the Index 8005 indicating the relation with the sample entry, the Duration 8006 indicating time for displaying the text sample are together called text header data, and a Text Sample, which includes the Text length 8007 indicating the length of the text included in the text sample, the text 8008 to be displayed and the information Modifier 8009 for modifying the text, is called divided text data. Moreover, text playback data means the MP4 file 3000 mentioned in FIG. 1. Data that forms a header section 3010 of the MP4 file 3000 shown in FIG. 1 is stored in the text frame of the RTP packet together with the corresponding text sample (divided text data) as text header data (Length 8004 indicating the text frame length, Index 8005 indicating the relation with the sample entry, and Duration 8006 indicating time for displaying the text sample) shown in FIG. 4.

An explanation is next given of the configuration of the Header Extension (extension header) 8003 that describes information of the text frame included in a next RTP packet (SN=2). The Header Extension (extension header) 8003 includes No. of Next Samples 8201 indicating the number of text frames included in a next RTP packet, Next Sample Duration #1 8202 indicating information of the text frame included in a next RTP, Next Sample Length #1 8203, Next Sample Duration #2 8204, Next Sample Length #2 8205 . . . . When No. of Next Samples 8003 is 3, this indicates that three text frames are included in the next RTP packet. An explanation is given of Next Sample Duration #1 8202 and Next Sample Length #1 8203, which are information of the first text frame included in the next RTP packet. The second text frame and the following are the same as that of the first text frame and the explanation is omitted. Next Sample Duration #1 8202 indicates text display time of the first text frame included in the next RTP packet. Next Sample Length #1 8203 indicates a text length to the first text frame included in the next RTP packet. In other words, Next Sample Duration #1 8202 is the same as Duration 8212 of the RTP packet with SN=2, and Next Sample Length #1 8203 is the same as Text Length 8213 of the RTP packet with SN=2.

An explanation is given of an example of an operation of a receiving terminal when the above transmission structure is used. An explanation is given of an example in which display as illustrated in FIG. 5 is given to the receiving terminal apparatus. First of all, "Could you help me out?" whose text length is 22 is displayed for 6 seconds and "Sure" whose text length is 5 is displayed for 3 seconds, and "Thanks" whose text length is 7 is displayed for 5 seconds. In addition, space is also counted in the number of characters.

Figure 16:
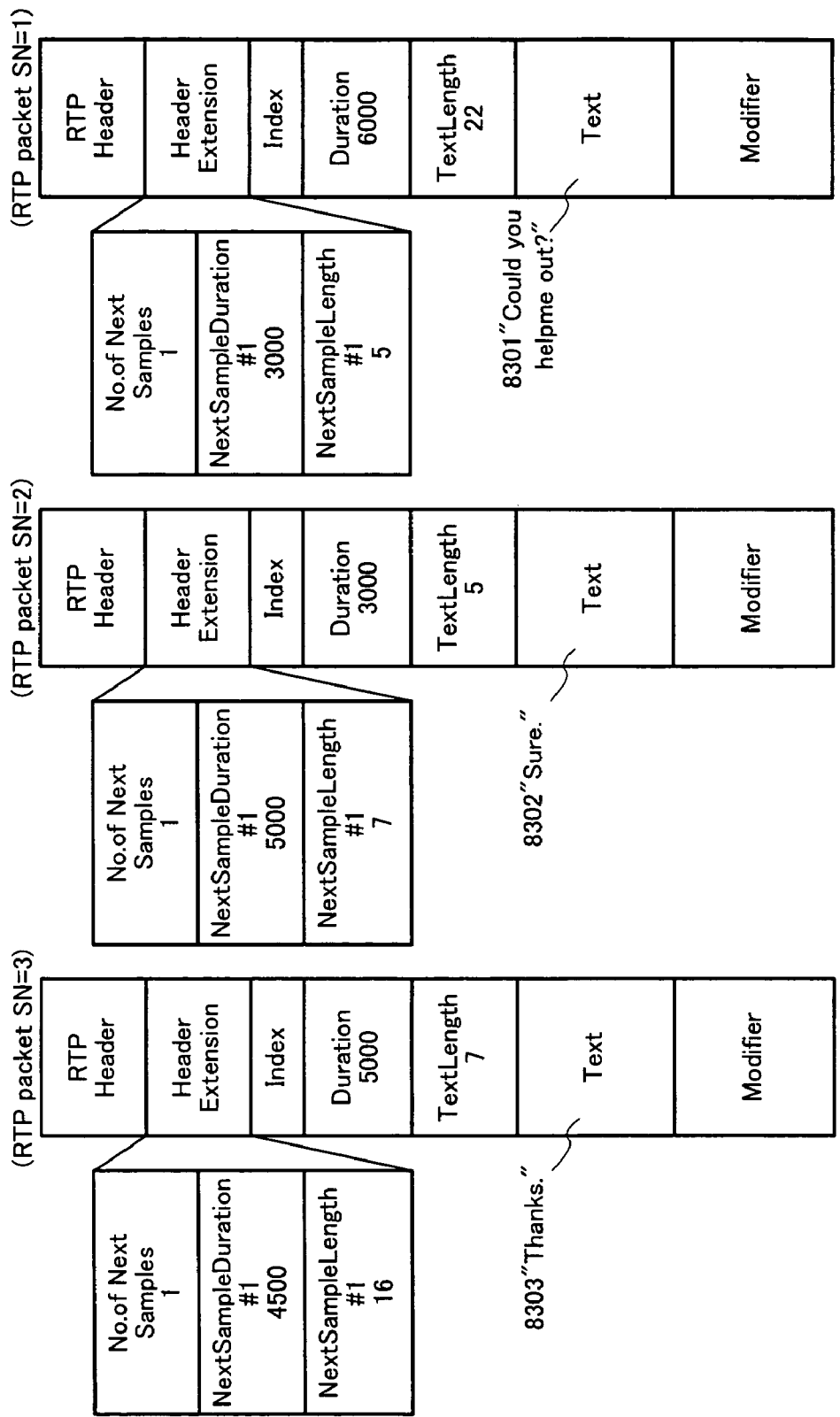
FIG. 16 is a schematic diagram illustrating a data structure of the present invention.

An explanation is given of a method for storing Timed Text to the RTP packet in this case using FIG. 16. Additionally, in this case, an explanation is given of a case in which one text sample is stored in 1RTP. In the RTP packet with SN=1, "Could you help me out?" is stored in a Text field and 6000 is stored in Duration, and 22 is stored in Text length. 3000 and 5 are stored in Next sample duration, which indicates text frame display time included a next RTP packet (SN=2), and Next Sample Length, respectively, and "Sure." having 5 characters is displayed for 3 seconds. Afterward, text information is stored in RTP packets SN2 and SN3, similarly.

An explanation is next given of a display operation of the data receiving apparatus when the RTP packet is lost using FIG. 17.

First of all, an explanation is given of an operation of the data receiving apparatus when the packet is lost. In FIG. 17A, the horizontal axis denotes time and time t1, t2, t3, and t4 denote time at which the text included in the RTP packet (SN=1, SN=2, SN=3, SN=4) is played, respectively. When the pre-buffering time is 0, times t1, t2, t3, t4 become equal to time at which the RTP packet (SN=1, SN=2, SN=3, SN=4) is received. When the pre-buffering time is ptime (second), time at which the RTP packet (SN=1, SN=2, SN=3, SN=4) is received becomes t1+ptime, t2+ptime, t3+ptime, t4+ptime1. Here, an explanation is given on the assumption that pre-buffering time is 0.

Moreover, as illustrated in FIG. 17A, for example, it is assumed that a second conversion value of display time DUR (Duration) included in the RTP packet with SN=1 is 5 seconds, and that a second conversion value of second display time DUR (namely, NDUR (Next Duration)) is 6 seconds. In other words, time at which the text included in the RTP packet with SN=1 is displayed is 5 seconds, time at which the text included in the next RTP packet with SN=2 is displayed is 6 seconds, and this is equal to the second conversion value of DUR of the RTP packet with SN=2. Further, the same can be applied to the RTP packets after SN=2.

Then, this embodiment is characterized in that attention is paid to the points that playback start time of a next RTP packet (for example, SN=2) can be judged based on playback time (Duration) of a packet RTP (for example, RTP packet with SN=1) included in the RTP packet, and playback start time of a further next RTP packet (for example SN=3), which is subsequent to a next RTP packet (for example, SN=2), can be judged based on playback time (Next Sample Duration) of the next RTP packet (SN=2) included in the RTP packet (for example, RTP packet with SN=1) as described in connection with FIG. 18, thereby judging whether a retransmission request should be executed based on the playback time.

An explanation is next given of an operation when the RTP packet with SN=2 is lost using FIG. 17B. This embodiment is characterized in the point that the packet loss of the RTP packet with SN=2 is detected using a DUR value of SN=1 before an RTP packet with SN=3 is received.

The point that playback time of the RTP packet with SN=1 is 5 seconds can be calculated from the point that playback time information DUR (Duration) included in SN=1 is 5 seconds. Accordingly, time t2 at which playback of the RTP packet with SN=2 is started is a value obtained by adding 5 seconds of the playback time DUR to playback start time t1 of SN=1. Then, when the RTP packet with SN=2 is not received at text playback end time t2 of the RTP packet with SN=1 that started playback at time t1, it is determined that the RTP packet with SN=2 is lost and a retransmission request packet is transmitted.

Figure 18A:
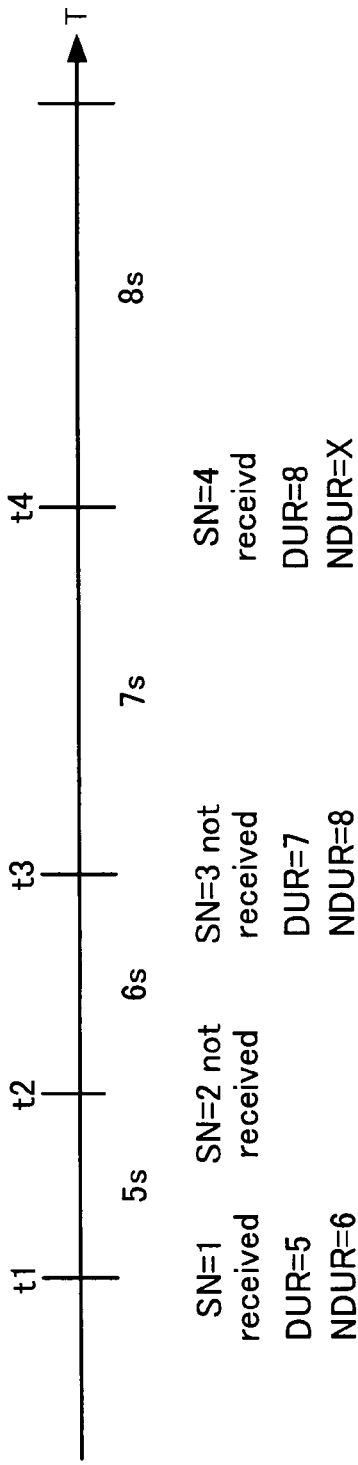
FIG. 18A is a schematic diagram illustrating a display operation of a data receiving apparatus.

An explanation is next given of an operation when two continuous RTP packets are lost using FIG. 18. FIG. 18A illustrates a case in which RTP packets with SN=2 and SN=3 are lost. In this case, similar to the case shown in FIG. 17, when the RTP packet with SN=2 is not received at the text playback end time t2 of the RTP packet with SN=1 that started playback at time t1, it is determined that the RTP packet with SN=2 is lost and a retransmission request packet is transmitted. Then, moreover, since display time (playback time) of the text included in the RTP packet with SN=2 ends at time t3, the retransmission request to the RTP packet with SN=2 is not transmitted after time t3 according to this embodiment. Namely, the retransmission request to the RTP packet with SN=2 is started at time t2 and the retransmission request is periodically executed until the RTP packet with SN=2 is received, and when the RTP packet with SN=2 is not received even at time t3, transmission of the retransmission request is stopped. This makes it possible to start the retransmission request to the RTP packet with SN=3 after time t3. Additionally, it is possible to judge the playback start time t3 of the RTP packet with SN=3 based on the playback time with SN=2 (Next sample duration) described in the previously received RTP packet with SN=1 and the playback start time t1 with SN=1. Additionally, in the following explanation, there is a case in which playback time (Next Sample Duration) of a next RTP packet is expressed as an NDUR (Next Duration).

Figure 18B:
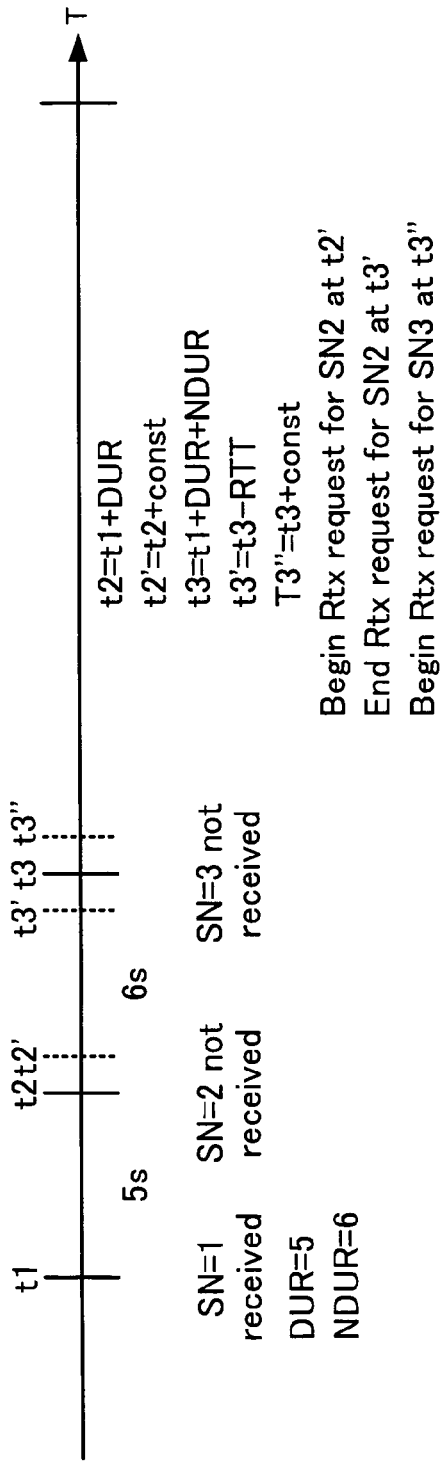
FIG. 18B is a schematic diagram illustrating a display operation of a data receiving apparatus.

Here, FIG. 18B is a schematic diagram illustrating another embodiment of retransmission request processing shown in FIG. 18A. The retransmission request processing illustrated in FIG. 18B differs from the case illustrated in FIG. 18A in the point that timing of the retransmission request transmission start and timing of the transmission end are different from the retransmission request start time t1, t2, t3 . . . .

In other words, for example, time t2' at which the retransmission request of the RTP packet with SN=2 is started is time t2' (=t2+const) that is obtained by adding a constant time ("const") to time t2 at which the RTP packet with SN=1 is started to be played. Accordingly, an error of reception timing of the RTP packet can be absorbed, and even if the RTP packet with SN=2 actually transmitted from the transmitting side is received after passing time t2, this can be received and played to make it possible to avoid transmission of a useless retransmission request.

Further, for example, end timing of the retransmission request of the RTP packet with SN=2 is time t3' (=t3−RTT) that is earlier than the playback start time t3 of the RTP packet with SN=3 by round trip communication time (Round Trip Time: RTT) between the receiving side and the transmitting side. Accordingly, in the case where the retransmission request is transmitted to the transmitting side from the data receiving apparatus and the transmitting side retransmits the RTP packet according to the retransmission request, if the retransmission request is transmitted from the data receiving apparatus before time t3', the RTP packet with SN=2 retransmitted before playback end timing (playback start time of the RTP packet with SN=3) of the RTP packet with SN=2 can be received by the data receiving apparatus.

In this way, according to the retransmission request processing of FIG. 18B, it is possible to more smoothly execute the retransmission request and the playback processing of the RTP packet retransmitted accordingly.

Figure 19:
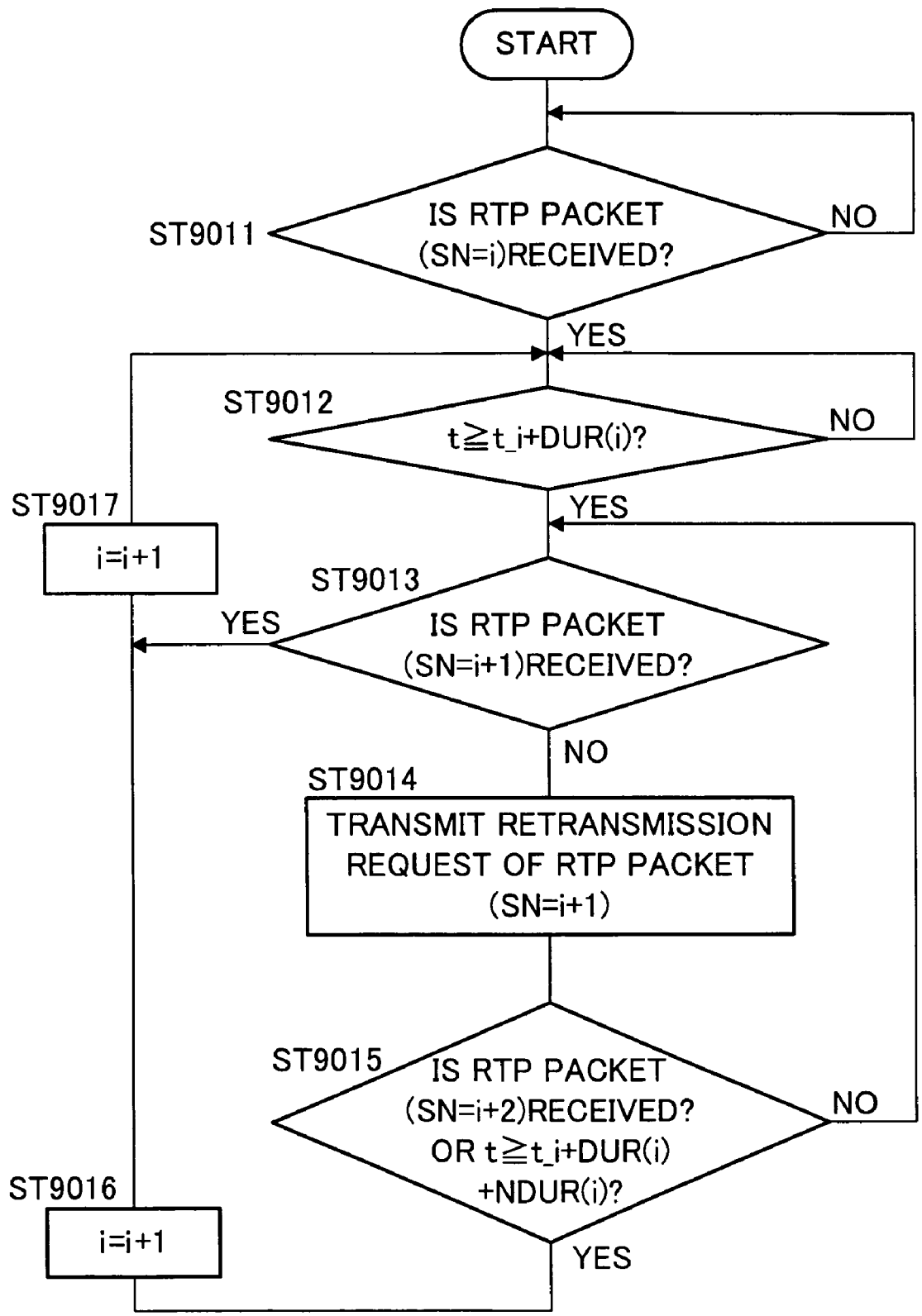
FIG. 19 is a view illustrating a flowchart showing a reception processing procedure of a data receiving apparatus.

The receiving operation of the data receiving apparatus at the time of receiving the above-explained RTP packet is explained using a flowchart illustrated in FIG. 19.

As illustrated in FIG. 19, the data loss determining section 1004 of the data receiving apparatus determines whether an RTP packet with SN=i is received in step ST9011. When a negative result is obtained here, this means that the RTP packet with SN=i is not yet received, at which time the data loss determining section 1004 repeats determining processing in the step ST9011.

In contrast to this, when a positive result is obtained in step ST9011, this means that the RTP packet with SN=i is received, at which time the data loss determining section 1004 goes to a next step ST9012 to compare current time t with time, which is obtained by adding playback time DUR(i) to playback start time ti of the RTP packet with SN=i, and determines the playback start time of a text included in an RTP with SN=i+1 has passed when the current time t is greater or equal to the above time, and goes to step ST9013.

Additionally, when a negative result is obtained in step ST9012, this means that playback start time of the text included in the RTP packet with SN=i+1 is not yet passed, at which time the data loss determining section 1004 repeats determining processing of the step ST9012.

In this way, when the playback start time of the text included in the RTP packet with SN=i+1 is passed, the data loss determining section 1004 goes to step ST9013 to determine whether the RTP packet with SN=i+1 is received. When a positive result is obtained in step ST9013, this means that playback time of the RTP packet with SN=i is passed, after which the RTP packet with SN=i+1 subsequent to this RTP packet is received, namely, display time of the RTP packet with SN=i is passed, at which time data to be next displayed is received. Accordingly, at this time, the data loss determining section 1004 moves to step ST9007 to increase i by 1, thereafter going back to the aforementioned step ST9012 to wait for the passage of display time of the RTP packet whose reception was confirmed in step ST9013.

In contrast to this, when a negative result is obtained in step ST9013, this means that playback time of the RTP packet with SN=i is passed, after which the RTP packet with SN=i+1 subsequent to this RTP packet is not received, namely, display time of the RTP packet with SN=i is passed, at which time data to be next displayed is not received; at this time, the data loss determining section 104 sends the retransmission request determining section 1018 a report indicating that the RTP packet to be received is not received.

Accordingly, the retransmission request determining section 1018 that received this report transmits a retransmission request about the RTP packet with SN=i+1 which should be received but is not yet received at this time.

While, after obtaining a result in which SN=i+1 is not received in step ST9013 to report it to the retransmission request determining section 1018, the data loss determining section 1004 moves to step ST9015 to determine whether an RTP packet with SN=i+2, which is subsequent to the RTP packet with SN=i+1 subjected to the retransmission request by the retransmission request determining section 1018, is received or compare current time t with time, which is obtained by adding the playback time DUR (i) and playback time NDUR (i) of SN=i+1 to playback start time ti of the RTP packet with SN=i, and judges whether current time t is greater at this time.

When a negative result is obtained here, this means that time does not reach time at which the RTP packet with SN=i+2 should be received; at this time, the data loss determining section 1004 goes back to the aforementioned step ST9013 to repeat processing in step ST9013 to step ST9015. Accordingly, before time at which the RTP packet with SN=i+2 should be received, judgment on whether or not the RTP packet with SN=i+1, which should be received before the RTP packet with SN=i+2, is received is executed, and when it is not received, the retransmission request of the RTP packet is repeated.

In contrast to this, when a positive result is obtained in step ST9015, this means that time reaches time at which the RTP packet with SN=i+2 should be received or the RTP packet is actually received; at this time, the data loss determining section 1004 moves to step ST9016 to increase i by 1, thereafter moving to step ST9017 to further increase i by 1.

In this way, when a positive result is obtained in step ST9015, the data loss determining section 1004 performs increase processing for i in step ST9016 and step ST9017 to increase i by 2 in total, and goes back to the processing in the aforementioned step ST9011 to repeat the same processing as the aforementioned case afterward.

In this way, according to the receiving processing procedure illustrated in FIG. 19, at the time of executing the retransmission request, whether or not the retransmission request is executed is determined based on the playback time of the RTP packet without waiting for the reception of the RTP packet, thereby making it possible to reduce time before the retransmission request is transmitted. Moreover, even when two RTP packets are continuously lost, it is possible to appropriately execute the retransmission request using the next playback time (NDUR) included in the RTP packet lately received.

In this way, according to the data receiving apparatus of this embodiment, whether or not the retransmission request is executed is determined based on the playback time of the RTP packet without waiting for the reception of the RTP packet, thereby making it possible to reduce time required for detecting the packet loss.

Moreover, though a case has been described with Embodiment 1 where text data is transmitted as static media data, the present invention is not limited to this and is applicable to cases of transmitting data including media data of static image data and CG, and program data by XML language. In this case, static image data, static media data or program data may be used in place of text data.

As explained above, according to the present invention, even when static media transmission data is lost due to reasons such as transmission error and the like, alternate static media can be displayed in the correct playback time. Moreover, according to the present invention, it is possible to reduce time required for detecting packet loss.

This application is based on Japanese Patent Application No. 2002-331410 filed on Nov. 14, 2002 and Japanese Patent Application No. 2003-16364 filed on Jan. 24, 2003, entire content of which is expressly incorporated by reference herein.

INDUSTRIAL APPLICABILITY

The present invention is suitable for use in a transmission data structure for transmitting, for example, static media data such as text data and the like and method and apparatus for transmitting such data.

The invention claimed is:

1. A transmission method for text transmission data, said text transmission data being for transporting and playing text playback data in order, said text playback data being for use for a playback of text data, said transmission method comprising:
   generating a payload section of the text transmission data based on the text playback data, said text playback data including a plurality of divided text data where the text data is divided and playback start information for starting a playback of the divided text data;
   generating a header section of the text transmission data to which text information contained in a next packet is added; and
   adding the header section to each generated payload section and making a packet,
   wherein each payload section includes the playback start information of the text header data.

2. A transmission method for text transmission data, said text transmission data being for transporting and playing text playback data in order, said text playback data being for use for a playback of text data, said transmission method comprising:
   generating a payload section of the text transmission data based on said text playback data including a plurality of divided text data where the text data is divided and playback start information for starting a playback of the divided text data;
   generating a header section of the text transmission data to which the number of divided text data contained in a next packet is added; and
   adding the header section to each generated payload section and making a packet,
   wherein each payload section includes playback start information of the text header data.

3. A transmission method for text transmission data, said text transmission data being for transporting and playing text playback data in order, said text playback data being for use for a playback of text data, said transmission method comprising:
   generating a payload section of the text transmission data based on said text playback data including a plurality of divided text data where the text data is divided and playback start information for starting a playback of the divided text data;
   generating a header section of the text transmission data to which playback time information of the divided text data contained in a next packet is added; and
   adding the header section to each generated payload section and making a packet,
   wherein each payload section includes the playback start information of the text header data.

4. A transmission method for text transmission data, said text transmission data being for transporting and playing text playback data in order, said text playback data being for use for a playback of text data, said transmission method comprising:
   generating a payload section of the text transmission data based on the text playback data, said text playback data including a plurality of divided text data where the text data is divided and playback start information for starting a playback of the divided text data;
   generating a header section of the text transmission data to which a text data length of the divided text data contained in a next packet is added; and
   adding the header section to each generated payload section and making a packet,
   wherein each payload section includes the playback start information of the text header data.

5. A receiving method for text transmission data, said text transmission data being for transporting and playing text playback data in order, said text playback data being for use for a playback of text data, said receiving method comprising:
   receiving first text transmission data and determining that there is a data loss when no second transmission data is received after a playback time of the first text data passes; and
   replacing text information relating to divided text data contained in next text transmission data contained in the first text transmission data with the second text transmission data, when it is determined that there is a data loss.

6. A reception and display method for text transmission data, said text transmission data being for transporting and playing text playback data in order, said text playback data being for use for a playback of text data, said method comprising:
   receiving first text transmission data and determining that there is a data loss when no second transmission data is received after a playback time of the first text data passes;
   replacing text information relating to divided text data contained in next text transmission data contained in the first text transmission data with the second text transmission data when it is determined that there is a data loss; and
   displaying an alternate text by a text data length when the text data length is 1 or more and executing no display of text data when the text data length is 0.

7. A data receiving apparatus comprising:
   a data receiving section that receives text data from a server or a counterpart station;
   a text display time extracting section that extracts a text display time for displaying text data from the received data;
   an extension header storing section that extracts and stores information of an extension header where text data information of next text data is stored from the received data;
   a data loss determining section that determines whether there is a loss of text data;
   a text extracting and storing section that extracts and stores text data from the received data;

an alternate text storing section that stores an alternate text to be displayed when no text data to be displayed is received;

a text display time deciding section that decides a text display time input from the extension header storing section as a time for displaying a text when the data loss determining section determines that there is a data loss, and decides a text display time input from the text display time extracting section as the time for displaying the text when it is determined that there is no data loss;

a display text deciding section that decides to display the text stored in the text extracting and storing section when the data loss determining section determines that there is no data loss, and decides to display the alternate text stored in the alternate text storing section when the data loss determining section determines that there is a data loss; and a text displaying section that displays the time decided by the text display time deciding section and the text decided by the display text deciding section.

8. A data transmitting apparatus that transmits text data to a counterpart station, comprising:

a text information storing section that stores text information to be transmitted to the counterpart station;

a next text data information generating section that generates information including a text length and/or a playback time contained in a text to be transmitted as next transmission data after transmission data currently being generated;

a header generating section that generates a header from control information for text data transmission and the next text data information generating information;

a payload generating section that generates a payload of transmission data from text data to be transmitted and its modification information;

a transmission data combining section that combines transmission data from the header and the payload; and a data transmitting section that transmits the transmission data to the counterpart station.

9. A transmission method for static image transmission data, said static image transmission data being for transporting and playing static image playback data in order, said static image playback data being for use for a playback of static image data, said transmission method comprising:

generating a payload section of the static image transmission data based on the static image playback data, said static image playback data including a plurality of divided static image data where the static image data is divided and playback start information for starting a playback of the divided static image data;

generating a header section of the static image transmission data to which static image information contained in a next packet is added; and adding the header section to each generated payload section and making a packet, wherein each payload section includes the playback start information of the static image header data.

10. A transmission method for static image transmission data, said static image transmission data being for transporting and playing static image playback data in order, said static image playback data being for use for a playback of static image data, said transmission method comprising:

generating a payload section of the static image transmission data based on the static image playback data, said static image playback data including a plurality of divided static image data where the static image data is divided and playback start information for starting a playback of the divided static image data;

generating a header section of the static image transmission data to which the number of divided static image data contained in a next packet is added; and adding the header section to each generated payload section and making a packet, wherein each payload section includes the playback start information of the static image header data.

11. A transmission method for static image transmission data, said static image transmission data being for transporting and playing static image playback data in order, said static image playback data being for use for a playback of static image data, said transmission method comprising:

generating a payload section of the static image transmission data based on the static image playback data, said static image playback data including a plurality of divided static image data where the static image data is divided and playback start information for starting a playback of the divided static image data;

generating a header section of the static image transmission data to which a playback time information of divided static image data contained in a next packet is added; and adding the header section to each generated payload section and making a packet, wherein each payload section includes the playback start information of the static image header data.

12. A transmission method for static image transmission data, said static image transmission data being for transporting and playing static image playback data in order, said static image playback data being for use for a playback of static image data, said transmission method comprising:

generating a payload section of the static image transmission data based on the static image playback data said static image playback data including a plurality of divided static image data where the static image data is divided and playback start information for starting a playback of the divided static image data;

generating a header section of the static image transmission data to which a static image size of divided static image data contained in a next packet is added; and adding the header section to each generated payload section and making a packet, wherein each payload section includes the playback start information of the static image header data.

13. A receiving method for static image transmission data, said static image transmission data being for transporting and playing static image playback data in order, said static image playback data being for use for a playback of static image data, said receiving method comprising:

receiving first static image transmission data and determining that there is a data loss when no static image transmission data of a second static image is received after a playback time of the first static image data passes; and replacing static image information relating to divided static image data contained in next static image transmission data contained in the first static image transmission data with the second static image transmission data when it is determined that there is a data loss.

14. A reception and display method for static image transmission data, said static image transmission data being for transporting and playing static image playback data in order, said static image playback data being for use for a playback of static image data, said method comprising:

receiving first static image transmission data and determining that there is a data loss when no static image transmission data of a second static image is received after a playback time of the first static image data passes;

replacing static image information relating to divided static image data contained in next static image transmission data contained in the first static image transmission data with the second static image transmission data when it is determined that there is a data loss; and displaying an alternate static image according to a size of the static image.

15. A data receiving apparatus comprising:

a data receiving section that receives static image data from a server or a counterpart station;

a static image display time extracting section that extracts a static image display time for displaying static image data from the received data;

an extension header storing section that stores information of an extension header where static image data information of next static image data is stored;

a data loss determining section that determines whether there is a loss of static image data;

a static image extracting and storing section that extracts and stores static image data from the received data;

an alternate static image storing section that stores a static image to be displayed when no static image data to be displayed is received;

a static image display time deciding section that decides a static image display time input from the extension header storing section as a time for displaying a static image when the data loss determining section determines that there is a data loss, and decides a static image display time input from the static image display time extracting section as the time for displaying a static image when it is determined that there is no data loss;

a display static image deciding section that decides to display the static image stored in the static image extracting and storing section when the data loss determining section determines that there is no data loss, and decides to display the alternate static image stored in the alternate static image storing section when the data loss determining section determines that there is a data loss; and a static image displaying section that displays the time decided by the static image display time deciding section and the static image decided by the display static image deciding section.

16. A data transmitting apparatus that transmits static image data to a counterpart station, comprising:

a static image information storing section that stores static image information to be transmitted to the counterpart station;

a next static image data information generating section that generates information including a static image size and a playback time contained in a static image to be transmitted as next transmission data after transmission data currently being generated;

a header generating section that generates a header from control information for static image data transmission and the next static image data information generating information;

a payload generating section that generates a payload of transmission data from static image data to be transmitted and its modification information;

a transmission data combining section that combines transmission data from the header and the payload; and a data transmitting section that transmits the transmission data to the counterpart station.

17. A data receiving method that receives static media transmission data indicating a playback time of static media data sent to play a plurality of static media data in order, comprising:

receiving first static media transmission data and making a determination as to whether second static media transmission data is received after a playback time of the first static media data to be played based on the first static media transmission data passes;

determining that there is a data loss when no second static media transmission data is received based on a determination result; and starting transmission of a retransmission request of the first static media transmission data when it is determined that there is a data loss.

18. A data receiving method that receives static media transmission data indicating a playback time of static media data sent to play a plurality of static media data in order and a playback time of next static media data to be played after the static media data, comprising:

receiving first static media transmission data and making a determination as to whether second static media transmission data for playing the next static media data subsequent to the first static media data is received after a playback time of the first static media data to be played passes, based on the first static media transmission data;

determining that there is a data loss when no second static media transmission data is received based on a determination result;

starting transmission of a retransmission request of the first static media transmission data when it is determined that there is a data loss; and ending the transmission of the retransmission request of the second static media transmission data according to the passage of a playback time of the next static media data based on a playback time of the next static media data included in the first static media transmission data.

19. The data receiving method according to claim 18, wherein a time that back by a round trip time that is required for a transmission of data between a transmitting side and a receiving side of the static media transmission data from a time at which a playback time of the next static media data ends, is set as a timing at which the transmission of the retransmission request of the second static media transmission data is ended.

20. A data receiving method that receives static media transmission data indicating a playback time of static media data sent to play a plurality of static media data in order, a playback time of next static media data to be played after the static media data and the number of characters included in the next static media data, comprising:

receiving static media transmission data and making a determination as to whether next static media transmission data for playing the next static media data subsequent to the static media data is received after a playback time of the static media data to be played passes, based on the static media transmission data;

determining that there is a data loss when no next static media transmission data is received based on a determination result; and starting transmission of a retransmission request of the static media transmission data based on a condition, which is shown by the static media transmission data, that the number of characters of the next static data is greater than 0 when it is determined that there is a data loss.

21. A data receiving apparatus that receives static media transmission data indicating a playback time of static media data sent to play a plurality of static media data in order, comprising:

a reception result determining section that receives first static media transmission data and makes a determination as to whether second static media transmission data is received after a playback time of the first static media data to be played passes, based on the first static media transmission data;

a data loss determining section that determines that there is a data loss when no second static media transmission data is received based on a determination result of the reception result determining section; and a retransmission request transmission starting section that starts transmission of a retransmission request of the first static media transmission data when the data loss determining section determines that there is a data loss.

* * * * *

UNITED STATES PATENT AND TRADEMARK OFFICE
CERTIFICATE OF CORRECTION

PATENT NO. : 7,801,182 B2
APPLICATION NO. : 10/527040
DATED : September 21, 2010
INVENTOR(S) : Daiji Ido et al.

It is certified that error appears in the above-identified patent and that said Letters Patent is hereby corrected as shown below:

Thtle Page, Item (54) and at Column 1, lines 1-3,
The title of the Letters Patent which issued on September 21, 2010, incorrectly reads:

"TRANSMISSION DATA STRUCTURE, AND METHOD AND DEVICE FOR TRANSMITTING THE SAME"

and should read:

"TRANSMISSION DATA STRUCTURE, AND METHOD AND APPARATUS FOR TRANSMITTING TRANSMISSION DATA STRUCTURE"

Signed and Sealed this
Fourth Day of January, 2011

David J. Kappos
*Director of the United States Patent and Trademark Office*